(12) United States Patent
Vento et al.

(10) Patent No.: US 11,958,102 B2
(45) Date of Patent: Apr. 16, 2024

(54) SYSTEMS AND METHODS FOR REPAIRING CHAINS

(71) Applicant: REXNORD INDUSTRIES, LLC, Milwaukee, WI (US)

(72) Inventors: Joseph Leo Vento, Franklin, WI (US); David Richard Woods, Menomonee Falls, WI (US); Kyle Steven Jansson, Brookfield, WI (US)

(73) Assignee: REXNORD INDUSTRIES, LLC, Milwaukee, WI (US)

( * ) Notice: Subject to any disclaimer, the term of this patent is extended or adjusted under 35 U.S.C. 154(b) by 487 days.

(21) Appl. No.: 17/320,515

(22) Filed: May 14, 2021

(65) Prior Publication Data

US 2022/0362835 A1    Nov. 17, 2022

(51) Int. Cl.
| | | |
|---|---|---|
| *B21L 21/00* | (2006.01) | |
| *B21L 9/06* | (2006.01) | |
| *F16B 39/282* | (2006.01) | |
| *F16G 15/12* | (2006.01) | |

(52) U.S. Cl.
CPC .............. *B21L 21/00* (2013.01); *B21L 9/065* (2013.01); *F16G 15/12* (2013.01); *F16B 39/282* (2013.01)

(58) Field of Classification Search
CPC ........ B21L 21/00; B21L 19/065; F16G 15/12; F16B 39/282
See application file for complete search history.

(56) References Cited

U.S. PATENT DOCUMENTS

| | | | |
|---|---|---|---|
| 1,235,321 | A | 7/1917 | James |
| 2,553,646 | A | 5/1951 | Field |
| 2,647,023 | A | 7/1953 | Kubaugh |
| 2,893,788 | A | 7/1959 | Yerian |
| 3,379,072 | A | 4/1968 | Kuntzmann |
| 3,711,928 | A | 1/1973 | Boggs |
| 4,263,779 | A | 4/1981 | Petershack |
| 4,494,945 | A | 1/1985 | Ogino |
| 4,506,501 | A * | 3/1985 | DeVall .................... B21L 9/065 29/402.09 |

(Continued)

FOREIGN PATENT DOCUMENTS

| | | |
|---|---|---|
| CN | 105736636 A | 7/2016 |
| DE | 102016014282 A1 | 5/2018 |

(Continued)

OTHER PUBLICATIONS

Superbolt Product Overview Page. Accessed on Apr. 18, 2021. Available online at http://web.archive.org/web/20210418232015/ https://www.nord-lock.com/superbolt/products/ezfit/.

(Continued)

*Primary Examiner* — Jason L Vaughan
(74) *Attorney, Agent, or Firm* — Quarles & Brady LLP

(57) ABSTRACT

A method of repairing a chain can include aligning a bore of an outer chain link with a bore of an inner chain link, inserting a pin through the aligned bores, the pin having a thread end opposite a head end, engaging a multi-jackbolt tensioner with the thread end of the pin, the multi-jackbolt tensioner having a plurality of fasteners, advancing each of the plurality of fasteners to press on the outer chain link, and forming an interference fit between the pin and the outer chain link at the bore of the outer chain link from the advancing of the fasteners.

20 Claims, 11 Drawing Sheets

(56) References Cited

U.S. PATENT DOCUMENTS

| | | | |
|---|---|---|---|
| 4,833,875 | A | 5/1989 | Buermann, Jr. |
| 4,998,907 | A * | 3/1991 | Sawada .................. B21L 9/065 |
| | | | 474/206 |
| 5,203,158 | A | 4/1993 | Bowers |
| 5,305,872 | A | 4/1994 | Hutton |
| 6,263,764 | B1 | 7/2001 | Steinbock |
| 6,453,657 | B1 | 9/2002 | Teravainen |
| 6,951,096 | B2 | 10/2005 | Maguire |
| 7,007,360 | B2 * | 3/2006 | Huenefeld .............. B21L 21/00 |
| | | | 29/252 |
| 7,100,353 | B1 | 9/2006 | Maguire |
| 7,246,699 | B2 | 7/2007 | Frost |
| 7,281,627 | B1 | 10/2007 | Gunston |
| 8,905,880 | B2 | 12/2014 | Inoue |
| 9,415,939 | B2 | 8/2016 | Arnold |
| 10,865,046 | B2 | 12/2020 | Frost |
| 10,982,540 | B2 | 4/2021 | Crystal |
| 2015/0292180 | A1 | 10/2015 | Sester |
| 2020/0023914 | A1 | 1/2020 | Galat |

FOREIGN PATENT DOCUMENTS

| | | |
|---|---|---|
| EP | 2143521 A1 | 1/2010 |
| FR | 2551821 A1 | 3/1985 |
| GB | 534277 A | 3/1941 |
| WO | 2006039412 A2 | 4/2006 |

OTHER PUBLICATIONS

International Search Report and Written Opinion, corresponding to PCT/US2022/028030, dated Oct. 11, 2022.

* cited by examiner

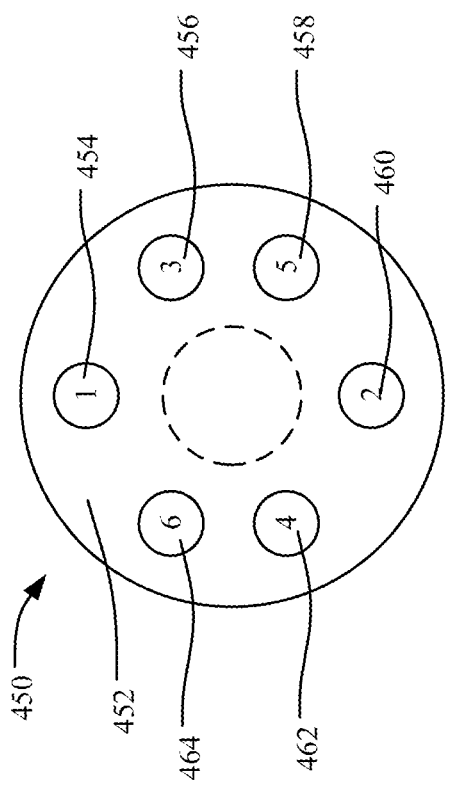
FIG. 14A
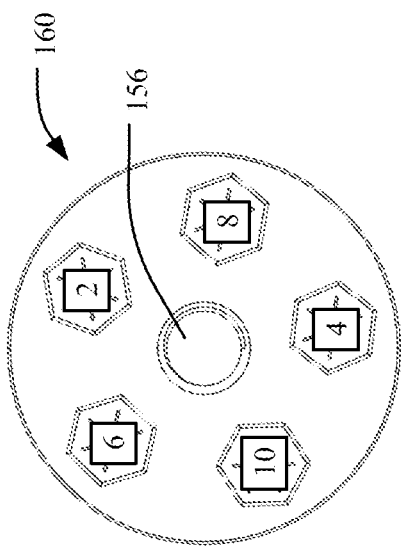
FIG. 14B
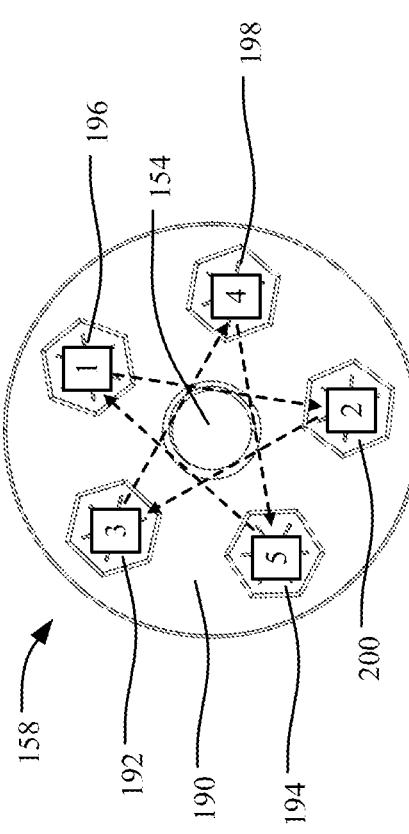
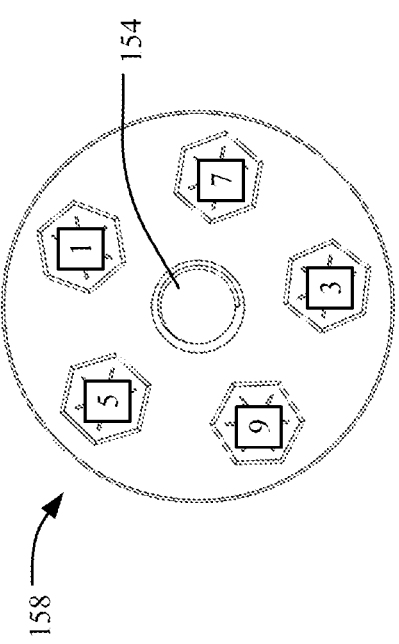
FIG. 14C

SYSTEMS AND METHODS FOR REPAIRING CHAINS

CROSS-REFERENCE TO RELATED APPLICATIONS

Not applicable.

STATEMENT REGARDING FEDERALLY SPONSORED RESEARCH

Not applicable.

BACKGROUND

Industrial chains are used in a variety of industries including conveyor (or elevator) systems for mines, processing plants, agricultural plants, recycling plants, refineries, foundries, and so forth. While certain chains may last longer than others, all chains in continual use eventually require repair or fail as components wear on one another during operation. Rather than replacing the entire chain, which would be quite costly, chain links are frequently repaired in the field to bring the conveyor system back into operation.

However, repairing chains in the field can be laborious, difficult, cumbersome, and slow. In many instances, the site of repair may be cramped or difficult for the repairperson to access. Still further, tools are often required as part of the repair process and, either based on the size of the tools (given the space and conditions of the working space for repair) or the availability of the power systems to run the tools, it can be physically and logistically difficult to execute a repair. Downtime can be very costly if a repair cannot be quickly implemented and so there remains a high demand for a robust and efficient system for repairing chains.

SUMMARY OF THE DISCLOSURE

Disclosed herein are improved systems and methods for repairing chains. The disclosed solutions may incorporate a multi-jackbolt tensioner which can be used to install a pin through chain links. The use of the multi-jackbolt tensioner can be employed without the need for heavy-duty hydraulic or electric equipment which may not be readily available on site or may be challenging to use in certain confined environments and thus can reduce downtime or the need for special equipment for repair. Rather, by the tightening of various small bolts in the multi-jackbolt tensioner, one end of a replacement pin may be tensioned to install the pin in the chain and, at least in some forms or conceptions, the tensioned end of the pin may be fractured or removed from the end of the pin after installation/repair is complete to remove any excess length.

Some embodiments of the disclosure provide a chain repair system. The chain repair system can include an inner chain link and an outer chain link each having a respective pair of bores and further include a pin. The pin can include a head end that defines a head, a thread end opposite the head end having threads, and a notch directed into a surface of the pin deeper than the threads of the pin. The notch can be located between the head end and the thread end. The chain repair system can include a multi-jackbolt tensioner. The multi-jackbolt tensioner can include a plurality of fasteners, a press plate having a centrally located hole, and a plurality of other holes that surround the centrally located hole that are threaded. Each fastener can be configured to be received through and threadingly engaged with a respective hole of the plurality of other holes. The multi-jackbolt tensioner can be configured to engage the pin. The multi-jackbolt tensioner can be configured to be externally positioned relative to the outer chain link. The multi-jackbolt tensioner can be configured to create an interference fit between the pin and the outer chain link at the bore of the outer chain link.

In some embodiments, as the plurality of fasteners are advanced through their respective hole of the press plate and with the press plate engaged with the pin, a distance between the press plate and the outer chain link is increased to force the pin through the bore.

In some embodiments, the pin includes another notch directed into the surface of the pin deeper than the threads of the pin, the other notch being located between the head end and the thread end. The notch can be directed into one side of the pin and the other notch can be directed into an opposing side of the pin.

In some embodiments, the notch and the other notch are each v-shaped cutouts.

In some embodiments, the threads of the thread end of the pin define a first threaded section. The thread end of the pin can include a second threaded section. The notch can be situated between the first threaded section and the second threaded section.

In some embodiments, the notch of the pins defines a bridge that connects the first threaded section to the second threaded section. In some embodiments, a width of the second threaded section is smaller than a width of the first threaded section. In some embodiments, a thickness of the bridge is smaller than the width of the second threaded section.

In some embodiments, the pin includes a peripheral flange that extends around the pin. In some embodiments, the peripheral flange is located between the first threaded section and the second threaded section.

In some embodiments, when the pin fractures at the notch, the first threaded section of the pin is decoupled from the pin.

In some embodiments, the chain repair system can include a nut that is configured to threadingly engage the first threaded section of the pin. In some embodiments, an end of the nut is configured to contact the outer chain link.

In some embodiments, the nut is one of a lock nut and a self-locking nut.

In some embodiments, an interference fit is created between the pin and the outer chain link when each fastener is advanced until each head of each fastener contacts the press plate.

In some embodiments, when the interference fit is created between the pin and the outer chain link, the inner chain link is configured to rotate about the pin.

In some embodiments, the chain repair system can include another inner chain link having another pair of bores, another pin, and another multi-jackbolt tensioner. In some embodiments, the other pin is configured to be received through the other bore of the outer chain link and a bore of the other inner chain link. In some embodiments, the other multi-jackbolt tensioner is configured to threadingly engage an end of the other pin and to force the other pin through the other bore of the outer chain link thereby forming an interference fit between the other pin and the outer chain link at the other bore.

In some embodiments, the multi-jackbolt tensioner does not contact the head end of the pin (e.g., the head of the pin) when the multi-jackbolt tensioner engages the pin.

Also disclosed herein is a method for repairing a chain. The method can include aligning a bore of an outer chain link with a bore of an inner chain link, inserting a pin through the aligned bores in which the pin has a thread end opposite a head end. The method can further include engaging a multi-jackbolt tensioner with the thread end of the pin (the multi-jackbolt tensioner having a plurality of fasteners), advancing each of the plurality of fasteners to press on the outer chain link, and forming an interference fit between the pin and the outer chain link at the bore of the outer chain link from the advancing of the fasteners.

In some embodiments, the method can further include fracturing, at a notch of the pin, at least a portion of the thread end of the pin from the pin.

In some embodiments, the method can include inserting the thread end of the pin through a hole of the outer chain link that partially defines the bore of the outer chain link, inserting the thread end of the pin through both holes of the inner chain link that define the bore of the inner chain link, threadingly engaging a centrally located hole of a push plate of the multi-jackbolt tensioner with the threads of the pin, the push plate having a plurality of other holes that surround the centrally located hole, each of which has threads, threadingly engaging each fastener with a respective hole of the plurality of other holes of the push plate, and advancing each of the plurality of fasteners to press on the outer chain link to separate the push plate away from the outer chain link.

In some embodiments, the method can include advancing each of the plurality of fasteners in an alternating pattern to iteratively rotate and advance the push plate.

In some embodiments, the method can include decoupling the multi-jackbolt tensioner from the pin and, after decoupling the multi-jackbolt tensioner from the pin, fracturing off a portion of the thread end of the pin from the pin.

In some embodiments, the method can include, after the at least portion of the thread end of the pin is decoupled from the pin, threadingly engaging a nut with the pin until the nut contacts the outer chain link.

The disclosure also provides a pin for repairing a chain that has an outer chain link and an inner chain link using a chain repair system. The pin can include a body having a first cross-section that is uniform throughout a length of the body, a head coupled to one of the body, the head having a larger cross-section than the first cross-section of the body, and an extension coupled to an opposing end of the body. The extension can have a first threaded section, a second threaded region, and a notch that is located between the first threaded region and the second threaded region. The notch can be directed into a surface of the pin deeper than the threads of the first and second threaded regions of the pin. The body of the pin can be configured to form an interference fit with the outer chain link at a bore of the outer chain link to couple the outer chain link to the pin. The pin can be configured to fracture at the notch to decouple the first threaded section from the pin.

The foregoing and other aspects and advantages of the present disclosure will appear from the following description. In the description, reference is made to the accompanying drawings that form a part hereof, and in which there is shown by way of illustration one or more exemplary versions. These versions do not necessarily represent the full scope of the disclosure.

BRIEF DESCRIPTION OF THE DRAWINGS

The following drawings are provided to help illustrate various features of non-limiting examples of the disclosure, and are not intended to limit the scope of the disclosure or exclude alternative implementations.

FIG. 14A shows a top view of the multi-jackbolt tensioner of the chain repair system of FIG. 2, engaged with the pin to illustrate a fastening order (e.g., a fastening pattern) for the fasteners.

FIG. 14B shows a top view of another multi-jackbolt tensioner engaged with a pin (not shown) demonstrating an iterative fastening pattern.

FIG. 14C shows a top view of a pair of the multi-jackbolt tensioners of the chain repair system of FIG. 2, each engaged with a respective pin, demonstrating an iterative fastening pattern for a dual tensioner repair.

DETAILED DESCRIPTION OF THE PRESENT DISCLOSURE

Figure 1:
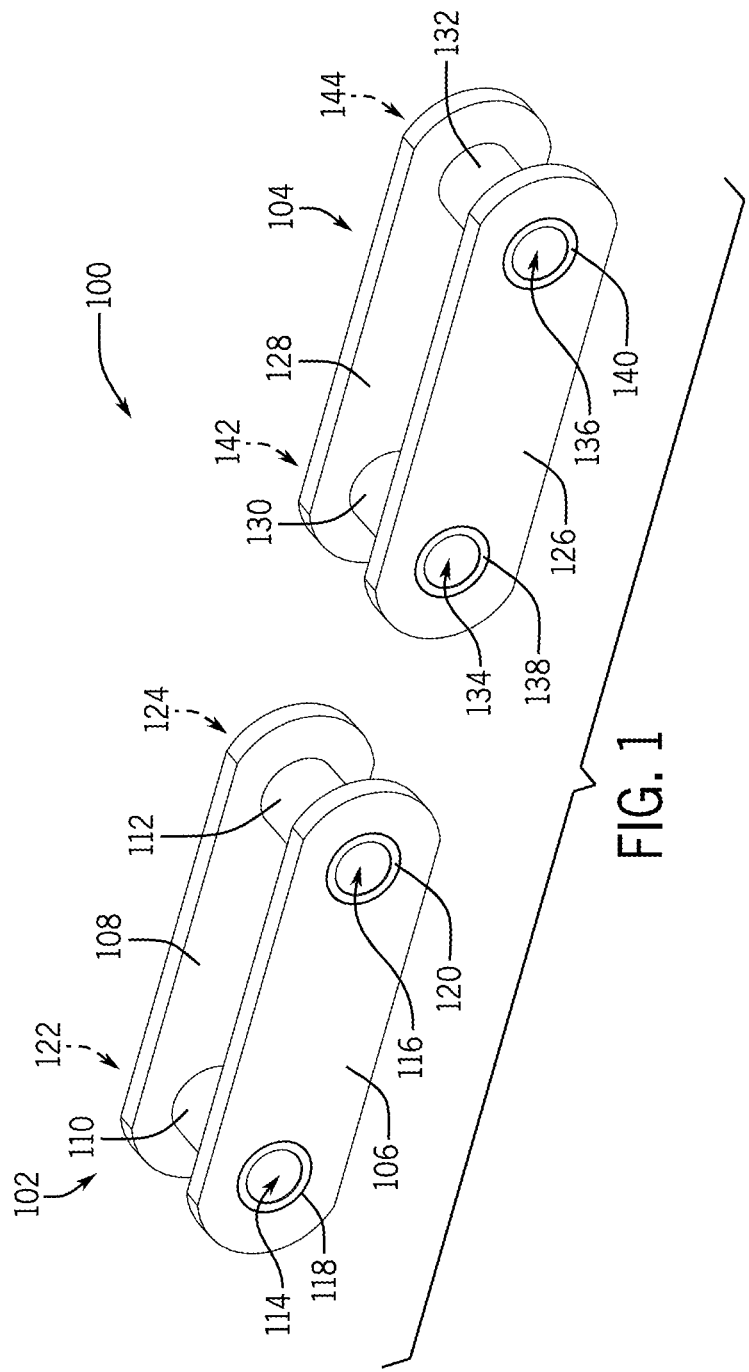
FIG. 1 shows a perspective view of a chain that has chain links, which are disconnected and are to be repaired (e.g., by coupling the chain links together).

As described above, repairing chains can be a difficult and time-consuming process. Typically, repairing chains, regardless of how the failure occurs, requires replacing one or more pins to rejoin the disconnected ends of the chain. For example, a replacement pin is inserted through a pair of bores, each through opposing ends of the chain to couple the chain links together. However, conventional repair methods have significant downsides.

For example, in one conventional approach, a welding torch can be used to physically join the end of the replacement pin to one of the chain links. However, welding often requires a combustible fluid to drive melting of the welding rod that deposits material to join the two components together. And because industrial chains often operate in enclosed spaces without ventilation, the welding approach cannot be used in this scenario (e.g., due to fear of leaking of the combustible fluid into the enclosed space), and at best, must be taken offsite for repairs. Additionally, the welding approach, assuming it is possible in a given situation, requires extensive operator skill. Thus, not every operator, and certainly not many, if at all present at the location the chain is being used at, are even capable (or available) to repair the chain. Still further, because the replacement pin has to be entirely inserted through both ends of each bore before welding, an interference fit is not formed at the coupling location between the chain link and the pin. This can be undesirable at least because each chain link is joined to its adjacent chain link with an interference fit, which is typically a stronger interface than the welded joint. And thus, because the welded joint is weaker, this is more likely to cause a subsequent failure at this weaker location rather than at different locations, which can be a hindrance for the site location that is using the chain (e.g., because this repaired chain is weaker than a new chain).

As another example, in a second conventional approach, a grinder can be used to physically join the end of the replacement pin to one of the chain links. However, a grinded joint has similar issues as the welded joint. For example, grinding the joint also requires the replacement pin to be entirely inserted through both ends of each bore before welding, and so an interference fit is also not formed at the coupling location between the chain link and the pin. While the grinder does not usually use combustible fluid and thus it can be used in enclosed spaces, it does require a battery that must be charged to power the grinder. And so, the operator must remember to charge the battery prior to repair, and to remember to bring the charged battery to the repair location (along with the grinder). As with the welding approach, the grinding approach also requires a skilled operator to join the components together, which may be difficult to locate someone with this skill set at the repair site. Thus, the chain may need to be brought to an offsite location for repairs, which increases downtime for the conveyor system (e.g., the time that the conveyor system cannot be used while the chain is being repaired).

As yet another example, in a third conventional approach, a hand powered pneumatic actuator, such as the Rexnord® Linkmaster and Rexnord® Drivemaster, can be used to create an interference fit between one end of the replacement pin and one of the chain links to physically join these components together. In particular, in this approach, the replacement pin is inserted through both bores as far as possible, and a drive assembly is placed around and in contact with both ends of the replacement pin. Then, an operator continuously drives the manual hand powered pump to force the replacement pin through the bore of the chain link thereby generating an interference fit between these components. While this approach does create an interference fit, multiple operators (e.g., three) are required to steady (or align) opposing sides of drive assembly (e.g., to ensure proper contact with the pin), and to operate the pneumatic pump to force to the drive assembly together to create the interference fit. Additionally, because this approach utilizes a hand powered pneumatic actuator, it can take a significant amount of time, and considerable manual effort, to drive the pump and create the interference fit.

Some embodiments of the disclosure provide solutions to these issues (and others) by providing improved systems and methods for repairing chains. For example, some embodiments of the disclosure provide a chain repair system that includes a replacement pin that has a notch. The replacement pin can be inserted through two aligned bores of an outer chain link and an inner chain link, respectively. Then, the replacement pin can be pulled through an end of the bore of the outer chain link to create an interference fit between the replacement pin and the outer chain link. In some cases, the replacement pin can fractured at the notch once the replacement pin has been tensioned to a particular force sufficient to create an interference fit between the replacement pin and the outer chain link (e.g., which can be determined by different properties of the chain repair system, such as the amount of advancement of each fastener of the multi-jackbolt tensioner).

In some embodiments, the chain repair system can include a multi-jackbolt tensioner used to pull the replacement pin through the end of the bore of the outer chain link to create an interference fit between the outer chain link and the replacement pin. For example, the multi-jackbolt tensioner can include a push plate having a centrally located hole configured to receive and threadingly engage an end of the replacement pin, and a plurality of threaded holes surrounding the centrally located hole. The replacement pin is inserted through two aligned bores of an inner chain link and an outer chain link, respectively, and an end of the replacement pin can be threadingly engaged with the centrally located hole of the push plate (e.g., once the notch of the pin is advanced until it is external to the outer chain link). Each of the plurality of fasteners are then advanced to push the outer chain link into engagement with the replacement pin to create an interference fit between the outer chain link and the replacement pin.

In some cases, the chain repair system may include a multi-jackbolt tensioner and can provide significant advantages compared to prior chain repair systems. First, the multi-jackbolt tensioner has a much smaller footprint than other chain repair systems, and thus is much less cumbersome and is more easily transportable. In fact, by using the multi-jackbolt tensioner, only a single end of the pin needs to be contacted to repair the chain. In other words, to repair the chain, the multi-jackbolt tensioner advantageously does not contact both ends of the pin (e.g., the multi-jackbolt tensioner only engaging a single end of the pin, such as the thread end of the pin). This can be especially helpful, if the chain is operating in tight clearances or cramped spaces (e.g., a mine), or the chain has large width and thus the replacement pin is long. As such, the chain can be repaired onsite at the location of the chain failure or breakage, without the help of other operators, significantly decreasing any downtime the chain is not in use. In fact, because only a single end of the replacement pin needs to be engaged with the multi-jackbolt tensioner, a single operator can, by themselves, complete the chain repair. Second, because the multi-jackbolt tensioner does not require extensive operator skill, most operators can implement the chain repair, and thus the chain does not need to be brought offsite to repair the chain. Third, because the multi-jackbolt does not need an external power source, such as a combustible welding fluid, or power tools to repair the chain, the chain can be repaired without the worry of dangers associated with previous chain repair systems (e.g., combustible gas leaks from welding fluids). Fourth, the time needed to repair the chain using the multi-jackbolt tensioner is much faster than previous chain repair systems. For example, in some cases, using the multi-jackbolt tensioner can repair a chain in as little as five minutes as compared to as much as an hour for other chain repair systems (not even taking into consideration travel of the chain offsite to a repair location).

FIG. 1 shows a chain 100 that has chain links 102, 104, which are disconnected and are to be repaired for example, by coupling the chain links 102, 104 together. As shown, the chain link 102 includes plates 106, 108, bushings 110, 112, and bores 114, 116. The plates 106, 108 are separated from each other and are both coupled to the bushings 110, 112. Although the plates 106, 108 are illustrated as being planar and rectangular with rounded edges, the plates 106, 108 can be implemented to have different shapes or geometries. Each plate 106, 108 has holes that can at least partially define a respective bore. For example, the plate 106 has holes 118, 120 that are directed entirely through the plate 106, while the plate 108 has holes 122, 124 that are directed entirely through the plate 108. In some cases, the holes of the plates 106, 108 can provide a coupling location for the bushings 110, 112. For example, the bushing 110 can be inserted through the holes 118, 122 to couple the bushing 110 to the plates 106, 108 at these holes 118, 122 (e.g., by an interference fit). Similarly, the bushing 112 can be inserted through the holes 120, 124 to couple the bushing 112 to the plates 106, 108.

As shown, the bores 114, 116 each generally provide an access channel through and between both plates 106, 108 at two locations. Thus, each bore 114, 116 is configured to receive a pin, such as from an adjacent chain link. In some cases, such as illustrated in FIG. 1, the bushings 110, 112 can each entirely define their respective bore 114, 116, with the bores 114, 116 being coaxially positioned relative to the holes of the plates 106, 108 (e.g., with the bore 114 coaxially positioned relative to the holes 118, 122 and with the bore 116 coaxially positioned relative to the holes 120, 124). In other cases, such as described below, bores of other chain links can be defined by their holes of their plates. For example, the bore 114 can be defined by the holes 118, 122, while the bore 116 can be defined by the holes 120, 124.

In some embodiments, the bushings 110, 112 can include respective rollers coaxially received around the bushings 110, 112. In other cases, the bushings 110, 112 can be bushed rollers (e.g., steel bushed rollers). Regardless of the particular implementation, the interior surface of each bushing 110, 112 can provide a (lubricated) bearing surface that can allow a pin received through one of the bushings 110, 112 to easily roll over its interior surface.

As shown, the chain link 104 is structured in a similar manner as the chain link 102, and thus includes similar features as the chain link 102. For example, the chain link 104 also includes plates 126, 128, bushings 130, 132, and bores 134, 136. The bushings 130, 132 are each coupled to both plates 126, 128, and each plate 126, 128 also includes holes directed entirely therethrough. For example, the plate 126 includes holes 138, 140, while the plate 128 includes holes 142, 144. Similarly to the chain link 102, the bushing 130 is inserted through the holes 138, 142 to couple the bushing 130 to the plates 126, 128 at these holes 138, 142, while the bushing 132 is inserted through the holes 140, 144 to couple the bushing 132 to the plates 126, 128 at these holes 140, 144. As also similar to the chain link 102, each of the bushings 130, 132 can have an interior surface that can define a bearing surface that can allow a surface of a pin to roll along.

Although the chain 100 is illustrated in FIG. 1 as only having chain links 102, 104, it is appreciated that the chain 100 can have other chain links that are coupled to and extend from the chain links 102, 104. In other words, while the chain links 102, 104 each have only a single link, the chain links 102, 104 can have other numbers of links (e.g., a series of chain links).

Figure 2:
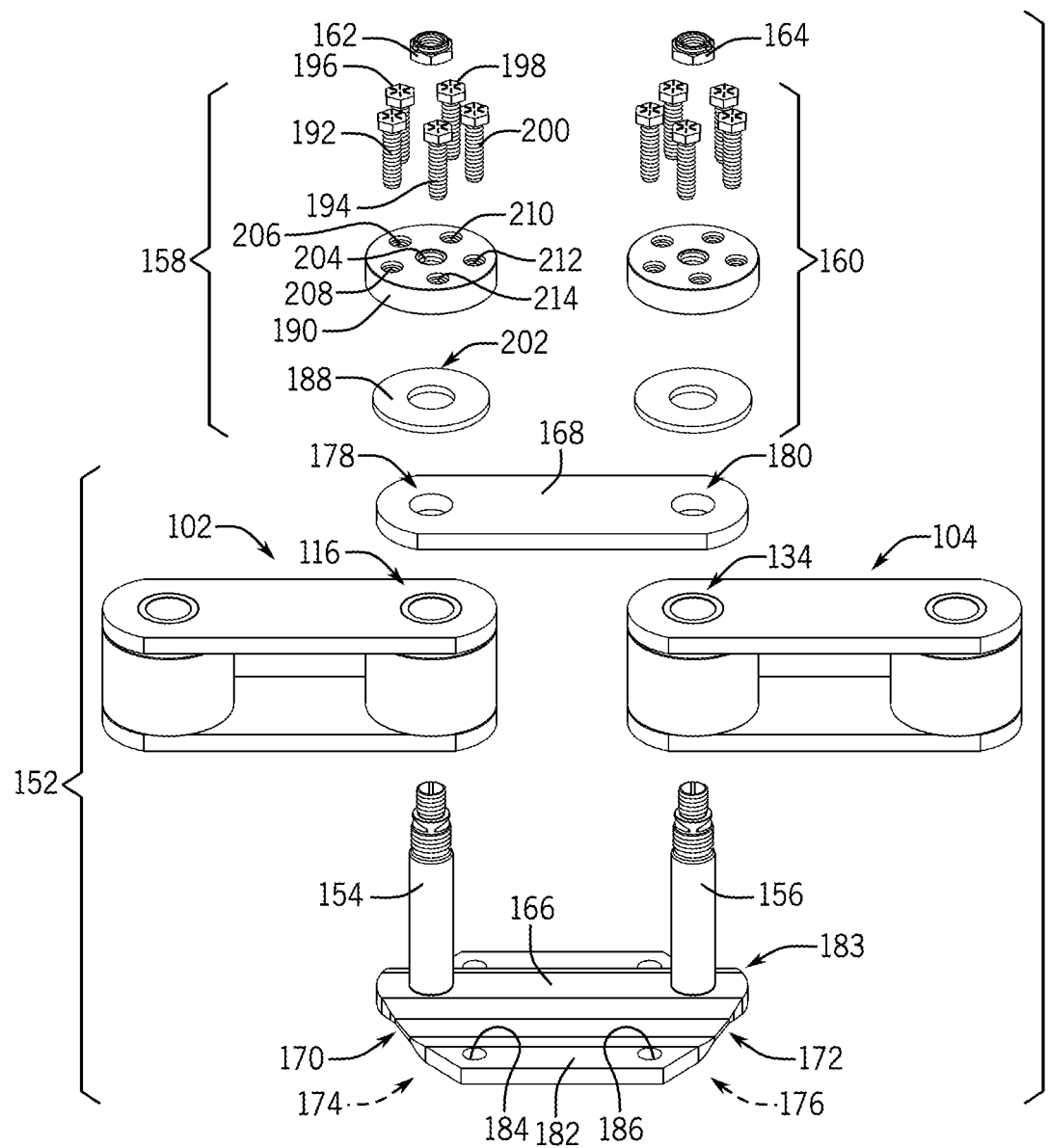
FIG. 2 shows an exploded view of a chain repair system.

FIG. 2 shows an exploded view of a chain repair system 150, which can include chain links 102, 104, 152 (for the same of clarity link 152 includes the plates that are not part of links 102, 104 as depicted), pins 154, 156, multi-jackbolt tensioners 158, 160, and nuts 162, 164. The chain link 152 can be implemented in a similar way as the chain links 102, 104, and can be defined as an outer chain link, while the chain links 102, 104 can be defined as an inner chain link. For example, the chain link 152 also includes plates 166, 168 that can collectively define bores 170, 172. In particular, the plate 166 has holes 174, 176 and the plate 168 also has holes 178, 180, where the holes 174, 178 can collectively define the bore 170 and where the holes 176, 180 can collectively define the bore 172. In some configurations, the plates 166, 168, can be structured similarly to each other (e.g., both having the same shape, such as being rectangular with rounded edges). In other configurations, the plates 166, 168 can be structured differently. In some embodiments, the plates 166, 168 can be structured similarly to the plates of the chain links 102, 104, while in other cases, each of the plates 166, 168 can be structured in a different manner as the plates of the chain links 102, 104. For example, the plate 166 (and the plate 168) can have a flanges 182, 183 that each extend away from the holes 174, 176 in opposing directions. Each of the flanges 182, 183 can include holes that can provide a coupling location for components. For example, the flange 182 can include holes 184, 186 that can facilitate the attachment of conveyor components (e.g., buckets, trays, etc.) by inserting fasteners (e.g., bolts) of the conveyor component through the holes 184, 186 (e.g., by threadingly engaging the holes 184, 186 with a respective fastener). In some embodiments, the holes of the flange 183 can also be used to attach the flange 182 to the conveyor component in a similar manner.

In some embodiments, each of the bores 170, 172 are configured to receive a respective pin 154, 156. For example, the pin 154 can be inserted through the hole 174 until a head of the pin 154 that has a larger cross-section than the hole 174 contacts the plate 166. Similarly, the pin 156 can be inserted through the hole 176 until a head of the pin 156 that has a larger cross-section than the hole 176 contacts the plate 166. As described in more detail below, with the pins 154, 156 inserted through the plate 166, the pins 154, 156 can be inserted through the chain links 102, 104. For example, the pin 154 is configured to extend entirely through the bore 116 of the chain link 102, and is configured to partially extend through the hole 178 of the plate 168 (e.g., a portion of a threaded end of the pin 154 being inserted through the hole 178). Similarly, the pin 156 is configured to extend entirely through the bore 134 of the chain link 104, and is configured to partially extend through the hole 180 of the plate 168 (e.g., a portion of a threaded end of the pin 156 being inserted through the hole 180). With the pins 154, 156 extended through the plate 166, the chain links 102, 104, and the plate 168, each of the multi jackbolt tensioners 158, 160 can be engaged with one of the pins 154, 156. For example, the multi jackbolt tensioner 158 is configured to engage the pin 154, while the multi jackbolt tensioner 160 is configured to engage the pin 156.

As shown in FIG. 2, the multi-jackbolt tensioner 158 can include a washer 188, a push plate 190, and fasteners 192, 194, 196, 198, 200 (e.g., bolts, screws, such as dog point screws, etc.). The washer 188 is illustrated as having a centrally located hole 202 that is configured to receive a portion of the pin 154 (e.g., when the pin 154 is received through the hole 178 of the plate 166). Although the washer 188 is illustrated as being circular and planar, the washer 188 can take on other shapes and spatial configurations (e.g., being non-planar). The push plate 190 can include a centrally located hole 204, and holes 206, 208, 210, 212, 214 that surround the centrally located hole 204. Although the holes 206, 208, 210, 212, 214 are located on the push plate 190 so that they appear in a star formation, in alternative configurations the holes 206, 208, 210, 212, 214 can be positioned in a different manner relative to each other. Additionally, while the illustrated configuration has five holes 206, 208, 210, 212, 214, in other embodiments, the push plate 190 can have other numbers of holes (e.g., four, six, etc.). Correspondingly, the number of fasteners can match the number of holes, so for example, if the push plate 190 has four holes, the multi-jackbolt tensioner 158 can have four fasteners. Each of the holes 206, 208, 210, 212, 214 can be threaded to threadingly engage a respective fastener 192, 194, 196, 198, 200. Additionally, the hole 202 can be threaded to threadingly engage a portion of the pin 154.

In some embodiments, and as illustrated in FIG. 2, each of the multi-jackbolt tensioners 158, 160 can be structured in a similar manner. Thus, similarly to the multi-jackbolt tensioner 158, the multi-jackbolt tensioner 160 can also include a washer, a push plate having a centrally located hole with a plurality of other holes surrounding the centrally located hole, and a plurality of fasteners each of which threadingly engages one of the plurality of other holes of the push plate. Because the multi-jackbolt tensioners 158, 160 can be structured in a similar manner, the description of the multi-jackbolt tensioner 158 above also pertains to the multi-jackbolt tensioner 160.

In some embodiments, some components of the chain link 152, the pins 154, 156, and the multi-jackbolt tensioners 158, 160 can be heat treated. For example, the plates 166, 168 of the chain link 152, the pins 154, 156, the washers of the multi-jackbolt tensioners 158, 160, and the push plates of the multi-jackbolt tensioners 158, 160 can each be heat treated (e.g., and correspondingly formed out of a metal). For example, the washers and the push plates of the multi-jackbolt tensioners 158, 160 can be heat treated and through hardened. Additionally, the pins 154, 156 can also be heat treated and through hardened, or can be indication hardened. In some cases, the pins 154, 156 can both be through hardened and indication hardened.

In some embodiments, the chain repair system 150 can include one or a plurality of lanyards (not shown), with each lanyard corresponding to a given fastener. Each lanyard can have a first loop positioned at one end of the lanyard, and a second loop positioned at an opposing end of the lanyard. The first loop of each lanyard is wrapped around the plate 168 and the second loop of each lanyard is inserted through the first loop. Then, each fastener is inserted into the second loop of each lanyard. In alternative configurations, each fastener can be inserted into one loop of a lanyard and the opposing loop of each lanyard can be engaged with a protrusion of the plate 168. In yet alternative configurations, each lanyard can temporarily tie together each pin to the plate 168. Regardless of the configuration, the lanyards can help to keep the multi-jackbolt tensioner 158 (including other components, such as portions of the pin 154) near the chain link 152 in the case the portion of the pin 154 is fractured during the repair process.

Figure 3A:
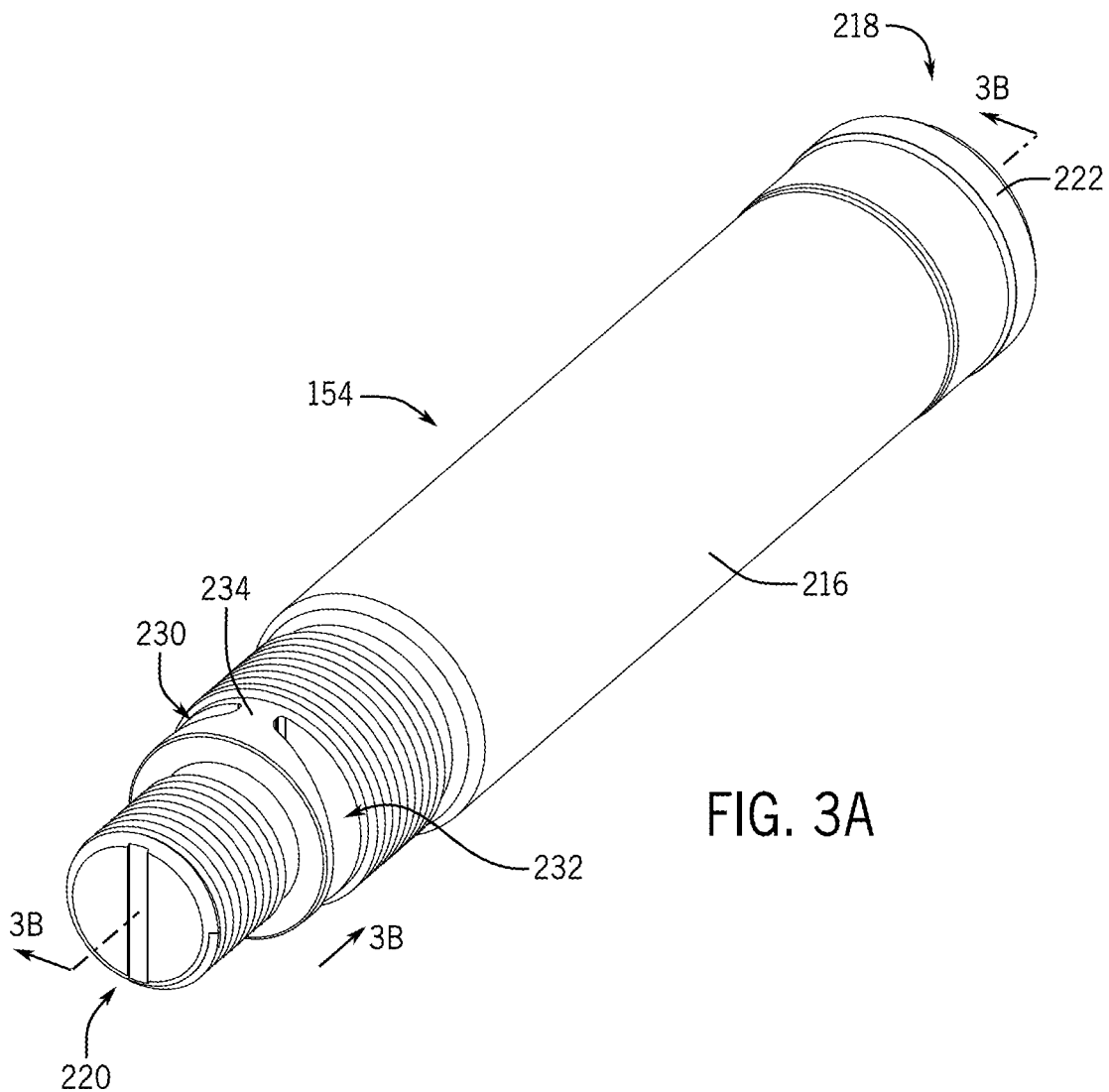
FIG. 3A shows a front perspective view of a pin of the chain repair system of FIG. 2.
Figure 3B:
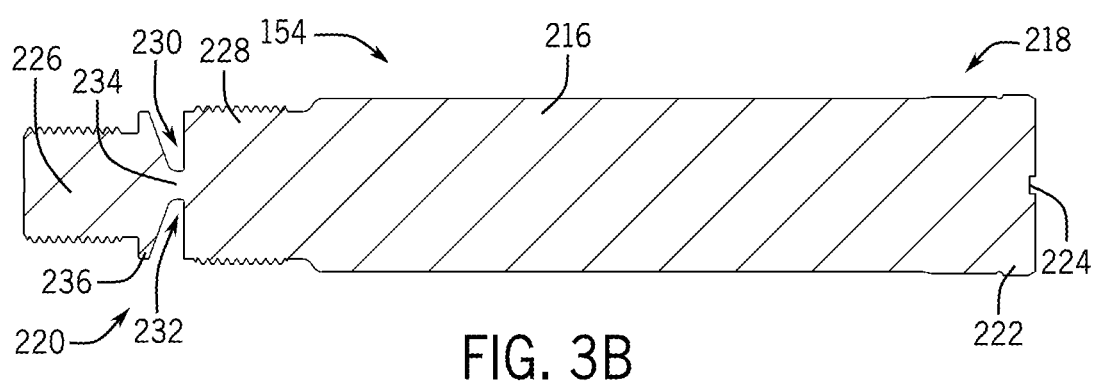
FIG. 3B shows a cross-sectional view of the pin taken along line 3B-3B of FIG. 3A.

FIG. 3A shows a perspective view of the pin 154, while FIG. 3B shows a cross-sectional view of the pin 154 taken along line 3B-3B of FIG. 3A. As shown in FIGS. 3A and 3B, the pin 154 includes a body 216, a head end 218 positioned on one end of the body 216, and an extension that defines a thread end 220 positioned on an opposing end of the body 216. In some cases, the head end 218 can be integrally formed with the body 216, and the thread end 220 can be integrally formed with the body 216. In some embodiments, and as illustrated, the body 216 of the pin 154 can have a uniform cross-section along its length, which can be larger than a cross-section of all portions of the thread end 220 of the pin and can be smaller than the cross-section of a head 222 of the head end 218. In some embodiments, the head 222 can include a recess 224 that is directed into an end of the head 222, which can be implemented to have various shapes (e.g., a rectangle).

As illustrated in FIG. 3B, the thread end 220 of the pin 154 can have threaded sections 226, 228, and notches 230, 232 that are situated between the threaded sections 226, 228. The threaded section 228 is situated closer to body 216 of the pin 154 than the threaded section 226 and has a cross-section that is larger than the cross-section of the threaded section 226. Each of the threaded sections 226, 228 have threads to threadingly engage components. For example, the threaded section 226 is configured to threadingly engage the centrally located hole 204 of the push plate 190, while the threaded section 228 is configured to threadingly engage the nut 162. The threaded sections 226, 228 are joined together by a bridge 234. In some cases, the bridge 234 has a thickness (e.g., relative to the cross-sectional view of FIG. 3B) that is smaller than the widths (e.g., the diameters) of the threaded sections 226, 228. The relatively small thickness of the bridge 234 can make removal of the threaded section 226 (e.g., after repair) easier (e.g., because the thickness is small). In some cases, the shape of the bridge 234 can be determined by the notches 230, 232. For example, the notch 230 is directed into one side of the pin 154 so that the notch 230 extends deeper into a surface of the pin 154 than the threads of the threaded section 226 (and the threaded section 228), while the notch 232 is directed into the other side of the pin 154 so that the notch 230 extends deeper into a surface of the pin 154 than the threads of the threaded section 226 (and the threads of the threaded section 228). Because the notches 230, 232 are v-shaped cutouts in the illustrated embodiment, the bridge 234 has a rectangular shape. However, in other configurations, the notches 230, 232 and the bridge 234 can have other shapes or geometries. For example, in some cases, rather than the notches 230, 232, the pin 154 at the same region can have a circumferential notch that extends around the entire pin 154. In this case, the bridge 234 can have other shapes such as a cylinder or circle.

In some embodiments, and as illustrated in FIG. 3B, the pin 154 can include a peripheral flange 236 that can extend circumferentially (e.g., partially or entirely) around the pin 154. In some cases, the peripheral flange 236 radially extends beyond the threaded section 226, and thus the peripheral flange 236 can have a cross-section (e.g., a diameter) that is greater than the cross-section (e.g., a diameter) of the threaded section 226 of the pin 154. The peripheral flange 236 is positioned between the threaded sections 226, 228, and in particular, is situated at an end of the threaded section 226 that is closer to the body 216 of the pin 154 (e.g., not the free end of the threaded section 226). In some cases, the peripheral flange 236 advantageously provides a stop point for the push plate 190. In other words, the push plate 190 at the centrally located hole 204 can be screwed onto the threaded section 226 of the pin 154 until the push plate 190 contacts the peripheral flange 236. This provides the operator with a tactile feedback for when to stop fastening the push plate 190, and also prevents further advancement of the push plate 190 towards the body 216 of the pin 154 during the repair process.

Similarly to the multi-jackbolt tensioners 158, 160, in some configurations the pins 154, 156 can be structured in a similar manner, and thus the previous description of the pin 154 also pertains to the pin 156. For example, the pin 156 can also include threaded sections separated by a bridge, a notch, a peripheral flange, and so forth.

Figure 4:
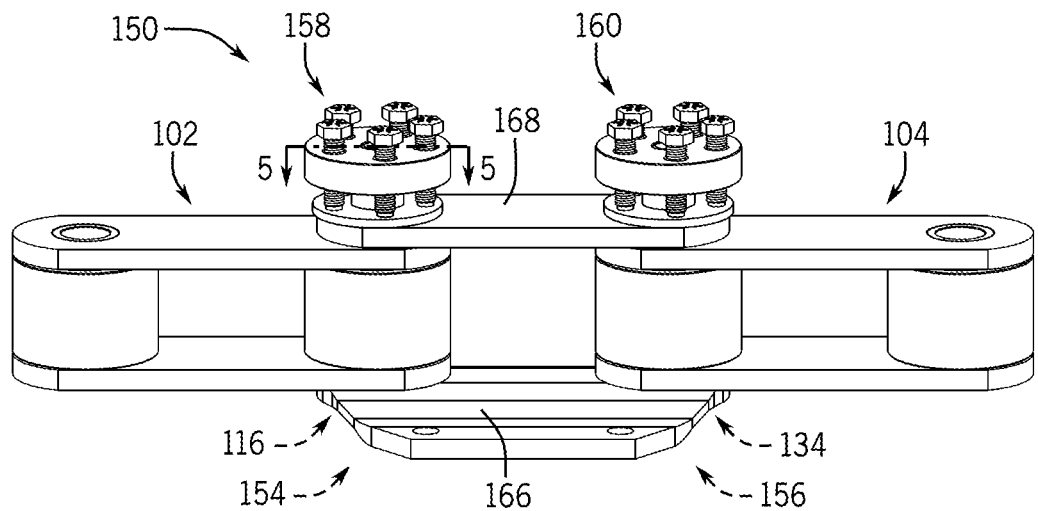
FIG. 4 shows a front perspective view of the chain repair system of FIG. 2 in an assembled configuration with the multi-jackbolt tensioners applied on the chain, but before they have been tensioned.

FIG. 4 shows a front perspective view of the chain repair system 150 in an assembled configuration, but before the multi-jackbolt tensioners 158, 160 have been tightened. For example, the pins 154, 156 have been inserted through the plate 166, through a bore of a respective chain link 102, 104, and through the plate 168. More specifically, the thread end 220 of the pin 154 is inserted through the hole 174 of the plate 166, through the bore 116 of the chain link 102, and through the hole 178 of the plate 168. In this way, the thread end 220 and in particular the threaded section 226, the notches 230, 232, and a portion of the threaded section 228 are external to the chain link 152 (e.g., external to the plate 168). Similarly, because the head end 218 and in particular the head 222 of the pin 154 has a larger cross-section than the hole 176 of the plate 166, the head end 218 of the head 222 of the pin 154 are external to the chain link 152 (e.g., external to the plate 166) when the pin 154 is inserted through the bores 170, 116.

With the pins 154, 156 being inserted (in a similar manner to each other), the multi-jackbolt tensioners 158, 160 can be engaged with the respective pin 154, 156. For example, the thread end 220 of the pin 154 can be inserted through the hole 202 of the washer 188 until the washer 188 contacts the chain link 152 (e.g., the plate 168 of the chain link 152). Then, the thread end 220 and in particular, the second threaded section 226 of the pin 154 can be threadingly engaged with the hole 204 of the push plate 190, and the push plate 190 can be advanced until a surface of the push plate 190 contacts the peripheral flange 236. After, each of the fasteners 192, 194, 196, 198, 200 can threadingly engage a respective hole 206, 208, 210, 212, 214, and can be advanced until each fastener 192, 194, 196, 198, 200 contacts the washer 188 (or the plate 168, such as when the washer 188 is omitted). Because the multi-jackbolt tensioners 158, 160 are structured in a similar manner, the multi-jackbolt tensioner 160 can be engaged with the pin 156 (e.g., the thread end of the pin 156) in a similar manner as the multi-jackbolt tensioner 158 engages the pin 154.

Figure 5:
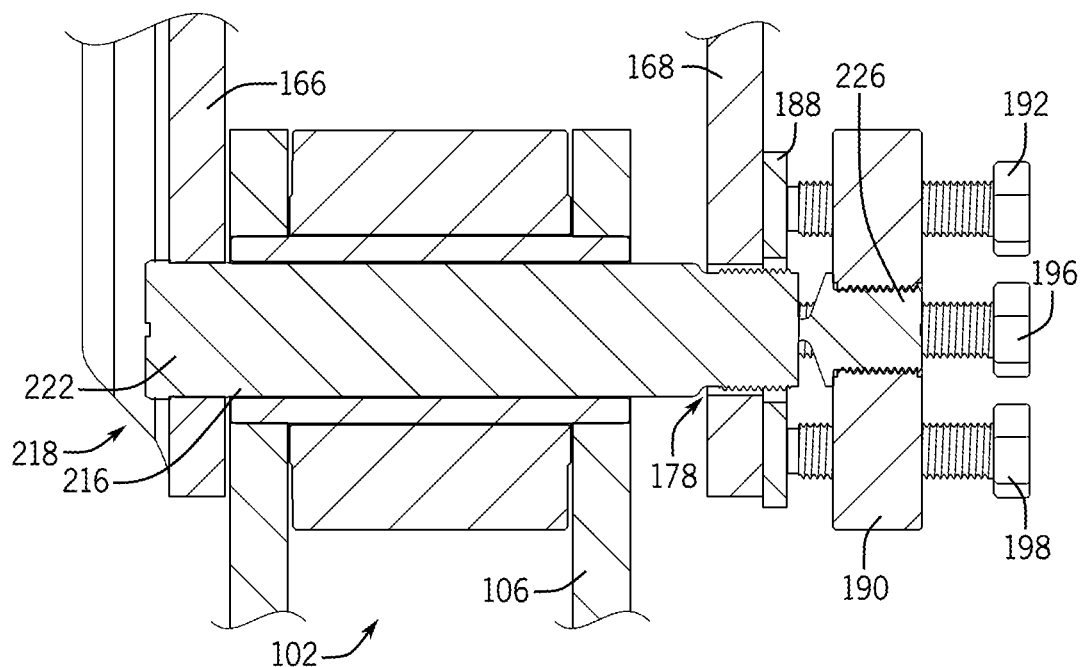
FIG. 5 shows a cross-sectional view of the multi-jackbolt tensioner of the chain repair system of FIG. 2 engaged with the pin taken along the line 5-5 of FIG. 4.

FIG. 5 shows a cross-sectional view of the multi-jackbolt tensioner 158 engaged with the pin 154 taken along the line 5-5 of FIG. 4, prior to repairing the chain links 102, 104 (e.g., creating an interference fit between the chain link 152 and the pin 154). As shown in FIG. 5, ends of each of the fasteners 192, 196, 198 are contacting the washer 188.

Figure 6:
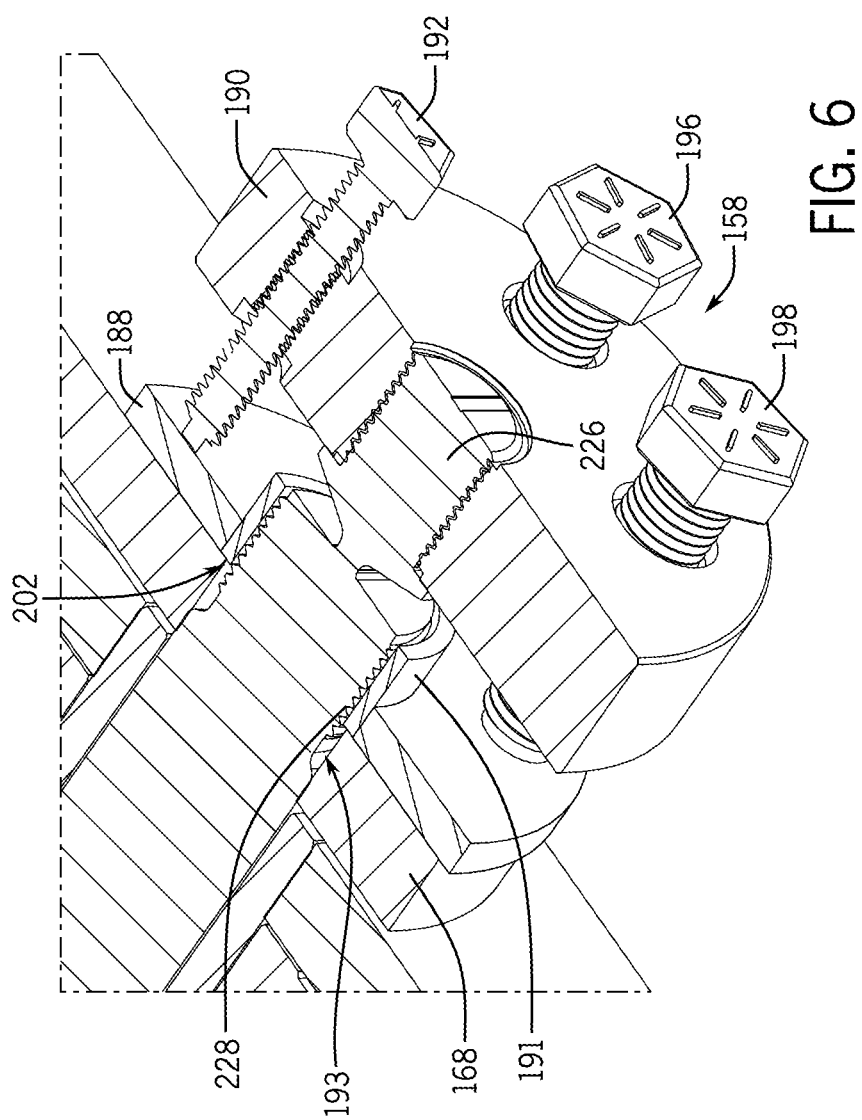
FIG. 6 shows a cross-sectional view of the multi-jackbolt tensioner of the chain repair system of FIG. 2 engaged with the pin.

In some embodiments, each of the multi-jackbolt tensioners 158, 160 can include a sleeve that can be received around a portion of each pin 154, 156. For example, as illustrated in FIG. 6, the multi-jackbolt tensioner 158 can include a sleeve 191 that can include a bore 193 directed therethrough. Prior to placing the push plate 190 into engagement with the pin 154 and the washer 188, the sleeve 191 can be placed around the threaded section 228 of the pin 154. Then, the washer 188 can be received around the sleeve 191 (e.g., the sleeve 191 being inserted through the hole 202 of the washer 188). In this way, the sleeve 191 can both protect the threads of the threaded section 228 of the pin 154, and can guide the appropriate placement of the washer 188, which can be important because the washer 188 distributes the compressive force onto the plate 168 (e.g., via the fasteners of the multi-jackbolt tensioner 158). In some embodiments, the sleeve 191 can be formed out of a plastic material, while in other cases, the sleeve 191 can be formed out of a metal. In some configurations, the sleeve of the multi-jackbolt tensioner 160 can be structured in a similar manner as the sleeve 191 of the multi-jackbolt tensioner 158.

Figure 7:
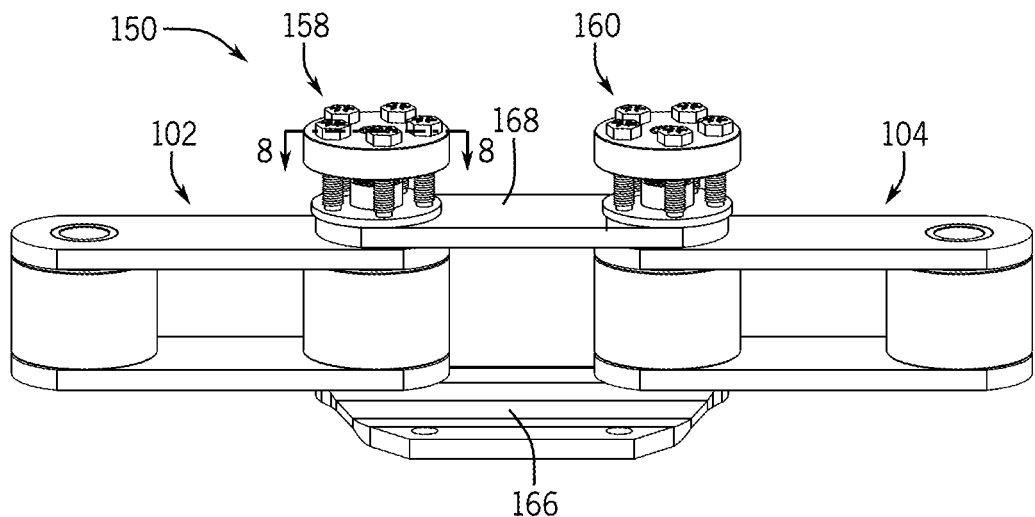
FIG. 7 shows another front perspective view of the chain repair system of FIG. 2 in an assembled configuration just after the chain links have been repaired by the application of the multi-jackbolt tensioners to join the pin to the outer links.
Figure 8:
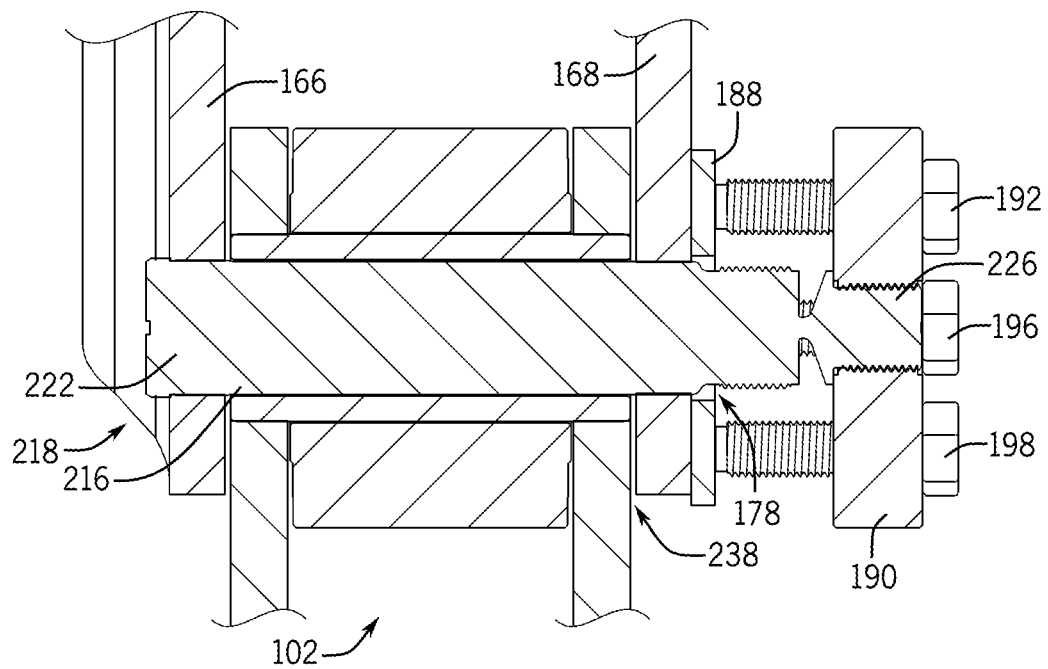
FIG. 8 shows a cross-sectional view of the chain repair system of FIG. 7 taken along line 8-8 of FIG. 7.

FIG. 7 shows a view of the chain repair system 150 in an assembled configuration just after the chain links 102, 104 have been repaired together (e.g., coupled together) and the plates 166, 168 pressed into place by the multi-jackbolt tensioners 158, 160, while FIG. 8 shows a cross-sectional view of the chain repair system 150 of FIG. 7 taken along line 8-8 of FIG. 7. As shown in FIG. 8, each of the fasteners 192, 196, 198 have been advanced (e.g., by further fastening) until each head of each fastener 192, 196, 198 contacts the push plate 190. Similarly, although not shown in FIG. 7, the fasteners 194, 200 also have been advanced until each head of each fastener 194, 200 contacts the push plate 190. In this way, as the fasteners 192, 194, 196, 198, 200 are advanced, the push plate 190 is forced further away from the chain link 152 (e.g., the plate 168 of the chain link 152). This simultaneously forces the body 216 of the pin 154 through the hole 178 of the plate 168 of the chain link 152 to generate an interference fit between the body 216 of the pin 154 and the plate 168 at the hole 178. In other words, the interior surface that defines the hole 178 of the plate is forced into contact with the surface of the body 216 of the pin 154 to generate an interference fit between the pin 154 and the plate 168 (e.g., with the pin 154 fixed in place relative to the plate 166).

In some embodiments, different factors can impact the degree of the interference fit (e.g., the compression force of the plate 168 onto the pin 154) between the body 216 of the pin 154 and the plate 168. For example, the length of each fastener (e.g., the distance between the surface of the push plate 190 and the plate 168 when each end of each fastener contacts the washer 188 (or the plate 168) and each head of each fastener contacts the push plate 190), the thickness of the push plate 190 (and correspondingly the length of the holes), the cross-section size of the body 216 of the pin 154, the cross-section size of the hole 178, the material of the body 216 of the pin 154, and the material of the plate 168 can each impact the degree of the interference fit between the body 216 of the pin 154 and the plate 168. In some cases, such as illustrated in FIG. 8, when the interference fit is created between the body 216 of the pin 154 and the plate 166 at the hole 178, a gap 238 occurs between the plate 106 of the chain link 104 and the plate 168 of the chain link 152. In this way, event when the interference fit is created between the pin 154 and the plate 168, the chain link 102 can still rotate about the pin 154. In other words, the gap 238 is dimensioned to allow a sufficient clearance between the plates 106, 168 to allow the chain link 102 to rotate about the pin 154. In some cases, the different factors above that impact the degree of the interference fit can be selected (e.g., implemented) to create the gap 238 being of a sufficient size to allow the chain 102 to rotate about the pin 154, while still creating an interference fit between the pin 154 and the plate 168.

In some embodiments, the fasteners of and between the multi-jackbolt tensioners 158, 160 can be iteratively advanced. For example, one fastener of the multi-jackbolt tensioner 158 can be advanced, then one fastener of the multi jackbolt tensioner 160 (e.g., the same fastener of the multi jackbolt tensioner 160) can be advanced, then a different fastener of the multi jackbolt tensioner 158 can be advanced, and then a different fastener of the multi jackbolt tensioner 160 can be advanced. In this way, the push plates for each of the multi jackbolt tensioners 158, 160 can be advanced away from the plate 168 by the same amount (and in the same orientation, such as with the same order of advancing the fasteners for each of the multi jackbolt tensioners 158, 160). In some embodiments, the fastening order within each multi jackbolt tensioner 158, 160 can be the same. In some cases, the fastening order of the fasteners of the multi jackbolt tensioner 158 can be in a clockwise direction, a counter-clockwise direction, a star pattern (e.g., with first fastener being fastened, a second fastener opposite the first fastener being fastened, and so on), etc.

Figure 9:
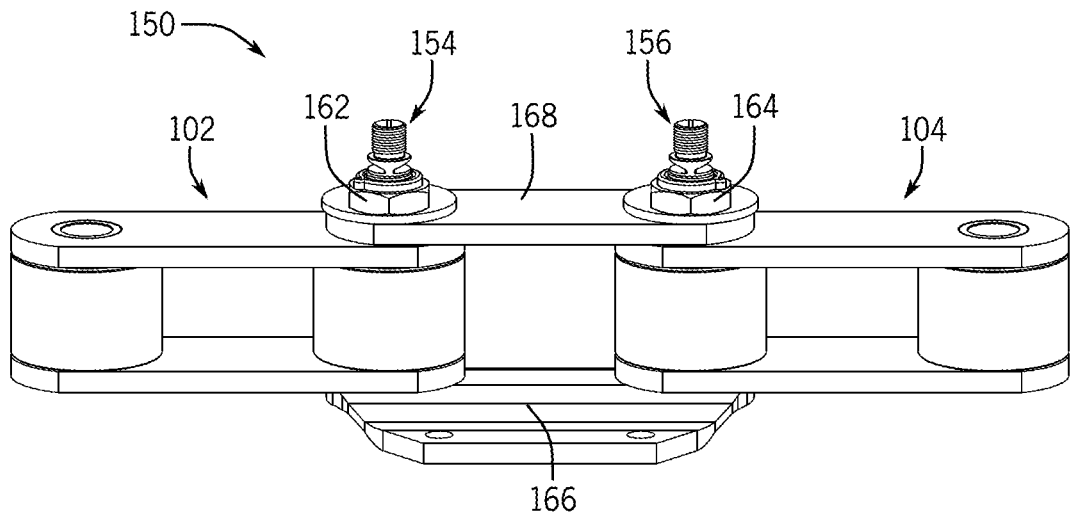
FIG. 9 shows another front perspective view of the chain repair system of FIG. 2 in an assembled configuration, after the chain links have been repaired together, and the multi-jackbolt tensioners of the chain repair system have been removed, and nuts applied to the threaded end of the pins.

FIG. 9 shows the chain repair system 150 in an assembled configuration, after the chain links 102, 104 have been repaired by introduction of link 152 (that is, plates 166, 168) and the multi jackbolt tensioners 158, 160 have been removed. For example, after an interference fit is created between the pin 154 and the plate 168, and an interference fit has been created between the pin 156 and the plate 168, the multi jackbolt tensioner 158 can be disengaged with the pin 154 and the multi jackbolt tensioner 160 can be disengaged with the pin 156. For example, each of the fasteners 192, 194, 196, 198, 200 can be retreated from (and removed from engagement with) their respective hole 206, 208, 210, 212, 214. Then, the push plate 190 can be retreated from (and removed from engagement with) the threaded section 226 of the pin 154, and the washer 188 can be removed from the pin 154. These processes can also be repeated for disengaging the multi jackbolt tensioner 160 from the pin 156. As shown in FIG. 9, with the multi jackbolt tensioners 158, 160 removed, portions of each of the pins 154, 156 are external to the plate 168. For example, the threaded section 226, the notches 230, 232, and a portion of the threaded section of the pin 154 (e.g., that is larger than the portion prior to repair) are externally positioned relative to the plate 168.

In some cases, after the multi jackbolt tensioners 158, 160 have been disengaged from the respective pin 154, 156, the nuts 162, 164 can be threadingly engaged with the respective pin 154, 156. For example, the nut 162 can be threadingly engaged with the threaded section 228 of the pin and fastened until the nut 162 contacts the plate 168. Similarly, the nut 164 can be threadingly engaged with the threaded section of the pin 156 that is closer to the plate 168 and fastened until the nut 164 contacts the plate 168. Each of these nuts 162, 164 can reinforce the connection between the pins 154, 156 and the plate 168 and prevent the pins 154, 156 from potentially axial sliding. In some configurations, other fastening mechanisms can provide an additional reinforcement between the pins 154, 156 and the plate 168. For example, an adhesive can be applied at the interface of the hole 178, 180 of the plate 168 and a portion of the pins 154, 156. As a more specific example, an adhesive can be applied in each hole of each nut 162, 164 prior to being fastened to the pins 154, 156. In this way, the adhesive, when solidified, can further reinforce the coupling between the nuts 162, 164, the respective pins 154, 156 and the plate 168. In some embodiments, the nuts 162, 164 can be a lock nut, a self-locking nut, or so forth.

Figure 10:
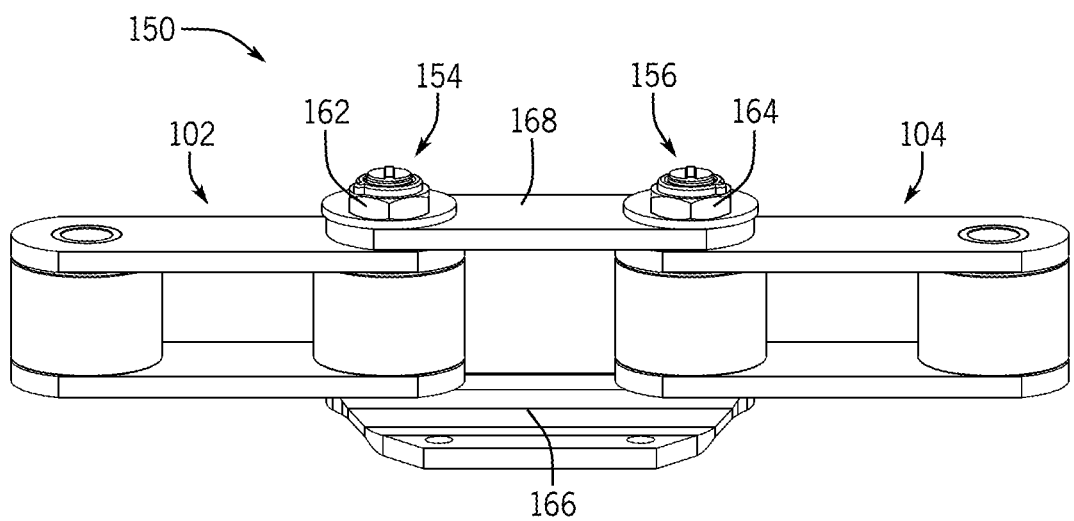
FIG. 10 shows another front perspective view of the chain repair system of FIG. 2 in an assembled configuration, after the chain links have been repaired together (e.g., coupled together), the nuts have been engaged with the respective pin, and a portion of the threaded section for each pin has been removed or fractured from the pin.

FIG. 10 shows a perspective view of the chain repair system 150 in an assembled configuration similar to FIG. 9, but after a threaded section for each pin 154, 156 has been removed. In some embodiments, after the nuts 162, 164 have been threadingly engaged with the respective pin 154, 156, the threaded section of each pin 154, 156 that is situated farther from the plate 168 can be removed. For example, the threaded section 226 can be decoupled from the pin 154 by shearing the bridge 234 (e.g., with a grinder tool, or cutting tool), by bending the threaded section 226 about the bridge 234 (e.g., using a torque bar that is positioned over the threaded section 226 and is rotated to break the bridge 234), by twisting the threaded section 226 about the longitudinal axis of the pin 154 (e.g., that extends along the length of the pin 154), or by pulling the threaded section 226 along the longitudinal axis of the pin 154. In some cases, removal of the threaded section of each pin 154, 156 that is situated farther from the plate 168 does not include using a flame (e.g., a torch). In this way, because the repaired components are not heated, the coupling provided by the interference fit is not undesirably degraded or intermittently overcome by the application heat. Regardless of how the threaded portions of the pins 154, 156 are removed, once an interference fit is created between only the pin 154 and the plate 168, or additionally an interference fit is also created between the pin 156 and the plate 168, chain links 102, 104 are re-linked together (e.g., via the chain link 152) and the chain 100 can be used again.

Figure 11:
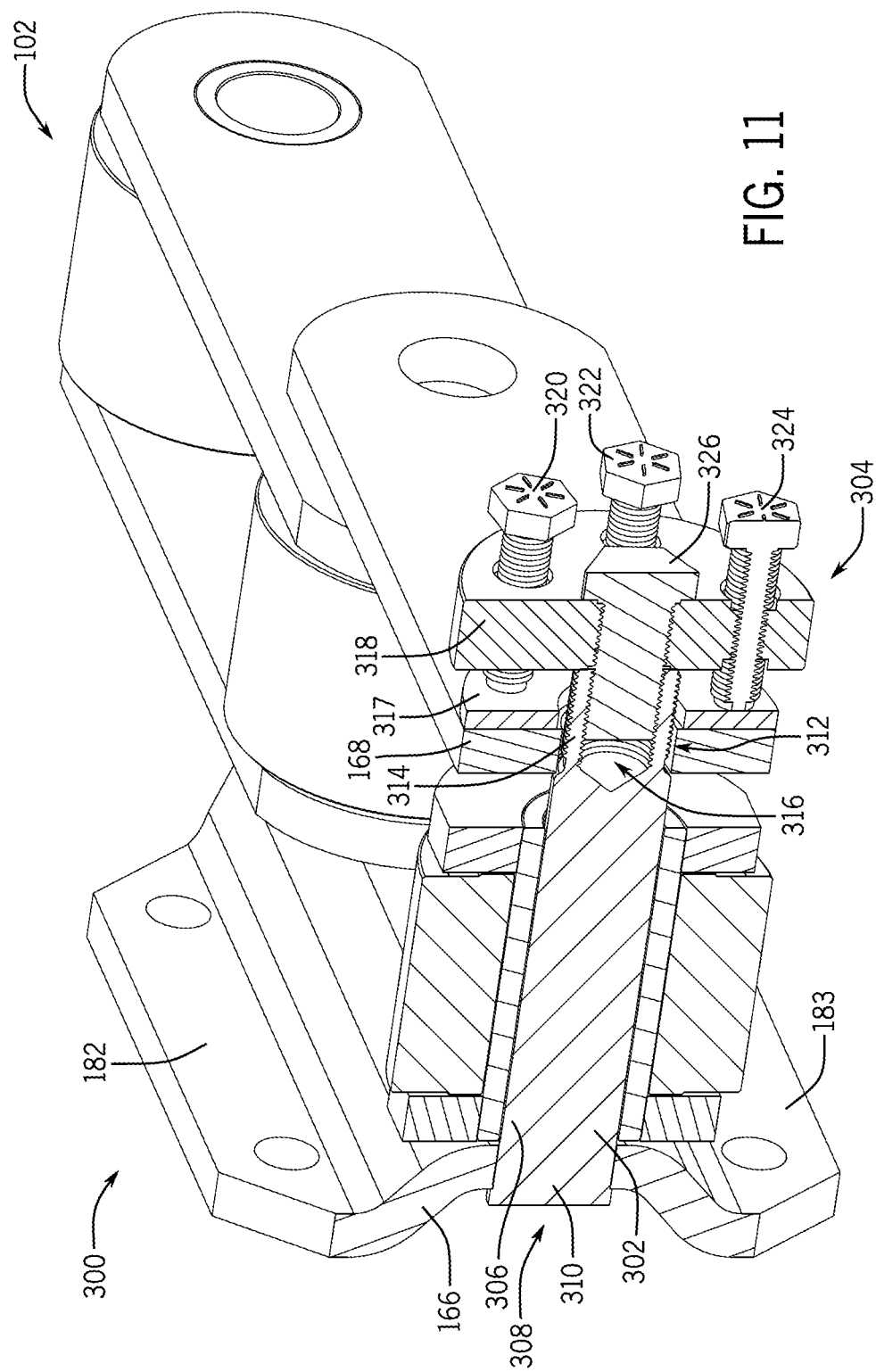
FIG. 11 shows a cross-sectional view of another alternative repair system.

FIG. 11 shows a cross-sectional perspective view of another alternative repair system 300 with a different form of engagement between the threaded end of the pin and the multi-jackbolt tensioner. The chain repair system 300 can otherwise be implemented in similar ways as the chain repair system 150, and thus the previous description of the chain repair system 150 also generally pertains to the chain repair system 300 excepting the differences discussed below and apparent from the figure. The chain repair system 300 can include the chain link 102, the chain link that includes the plates 166, 168, an alternative pin 302, and a multi-jackbolt tensioner 304. The pin 302 can define a body 306 with a uniform cross-section throughout the length of the body 306, a head end 308 situated on one end of the body 306 and including a head 310, and a thread end 312 situated on an opposing end of the body 306 and including a threaded section 314. As shown in FIG. 11, and differently from the earlier depicted pins, the pin 302 also includes a bore 316 that is axially directed into the threaded section 314, which bore 316 can include threads. In some cases, the exterior surface of the threaded section 314 of the pin 302 can also include threads.

The multi-jackbolt tensioner 304 can include a washer 317, a push plate 318, fasteners 320, 322, 324, and notably new central fastener 326. Although not illustrated in FIG. 11, the multi-jackbolt tensioner 304 can have an additional two (or other number of) fasteners (e.g., in a similar manner as the multi-jackbolt tensioners 158, 160). In some embodiments and as depicted, the central fastener 326 can have a larger cross section than the fasteners 320, 322, 324. As shown in FIG. 11, the central fastener 326 is threadingly engaged with the centrally located hole of the push plate 318 (surrounded by a plurality of other holes) and is threadingly engaged with the bore 316 of the pin 302. In this way, relative movement between the pin 302 and the push plate 318 is restricted so that when the other fasteners 320, 322, 324 are advanced to force the body 306 of the pin 302 into engagement with the plate 168 at the hole 178, the push plate 318 does not separate from the pin 302 (e.g., ensuring that the advancement of the fasteners pushes the plate 168 onto the pin 302, rather than separating the pin 302 from the push plate 318). Additionally, in this alternative case, the pin 302 does not include multiple threaded sections, and does not include a notch (and corresponding bridge) that separates the threaded sections of the pin. Thus, in this disclosed alternative a threaded section of the pin does not need to be directly decoupled or unthreaded from the push plate after an interference fit is created. This can make installation of the multi-jackbolt tensioner to the pin more user-friendly as the user does not need to rotate the push plate or the entire multi-jackbolt tensioner relative to the pin, which has the possibility of being somewhat awkward to execute given that the pin is not yet set in place, but rather only needs to bolt or secure one fastener (that is fastener 326) which can be more easily initiated and then assisted by a hand tool or the like.

Figure 12:
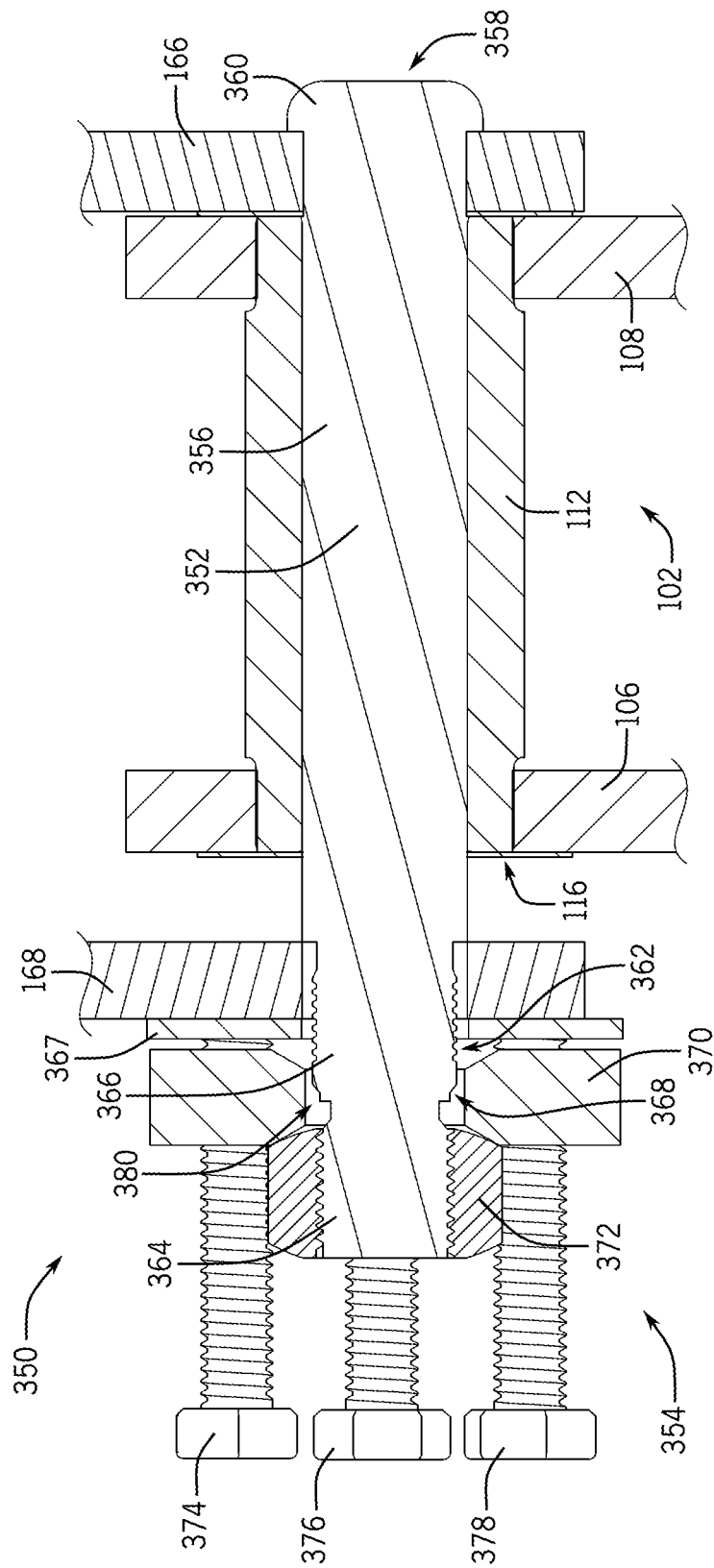
FIG. 12 shows a cross-sectional view of still another alternative repair system.

FIG. 12 shows a cross-sectional view of yet another repair system 350 but in which a nut 372 is used to engage the push plate 370 of the multi-jackbolt tensioner with the pin 352 (rather than the push plate being directly threaded onto the pin as in the first embodiment or the pin having a central fastener as in the second embodiment). The chain repair system 350 can be implemented in similar ways as the chain repair systems 150, 300, and thus the previous description of the chain repair systems 150, 300 also generally pertains to the chain repair system 350, excepting the differences discussed below.

The chain repair system 350 can include the chain link 102, the chain link that includes the plates 166, 168, a pin 352, and a multi-jackbolt tensioner 354. The pin 352 can define a body 356 with a uniform cross-section throughout the length of the body 356, a head end 358 situated on one end of the body 356 and including a head 360, and a thread end 362 situated on an opposing end of the body 356 and including threaded sections 364, 366. Additionally, the pin 352 also includes a circumferential notch 368 that is positioned between the threaded sections 364, 366 and which can extend entirely around the pin 352. Each of the threaded sections 364, 366 can include threads that can threadingly engage a component.

In this form, the multi-jackbolt tensioner 354 can include a washer 367, a push plate 370, a nut 372, and fasteners 374, 376, 378. Although not illustrated in FIG. 12, the multi-jackbolt tensioner 354 can have an additional number fasteners (e.g., in a similar manner as the multi-jackbolt tensioners 158, 160). As shown in FIG. 12, the push plate 370 includes a centrally located hole 380, and a plurality of other holes that surround the centrally located hole 380. A portion of the pin 352 is received through the hole 380 of the push plate 370 and the nut 372 is threadingly engaged with the threaded section 364 of the pin 352. In this way, the push plate 370 is situated between the nut 372 and the plate 168, with a surface of the push plate 370 in contact with a surface of the nut 372 to reduce (e.g., prevent) relative movement between the push plate 370 and the pin 352 during advancement of the fasteners 374, 376, 378 and so forth. In some embodiments, the surface of the push plate 370 can surround the centrally located hole 380, can be concave, and can be spherically shaped. Correspondingly, the surface of the nut 372 can be convex, and can be partly spherically shaped to be received or nested in this recess of the push plate 370. As the fasteners 374, 376, 378 (and others) are advanced through their respective holes of the push plate 370, the push plate 370 engages the nut 372 to pull the pin 352 whilst the plate 168 is pressed onto the body 356 of the pin 352 to create an interference fit between the body 356 of the pin 352 and the plate 168.

Figure 13:
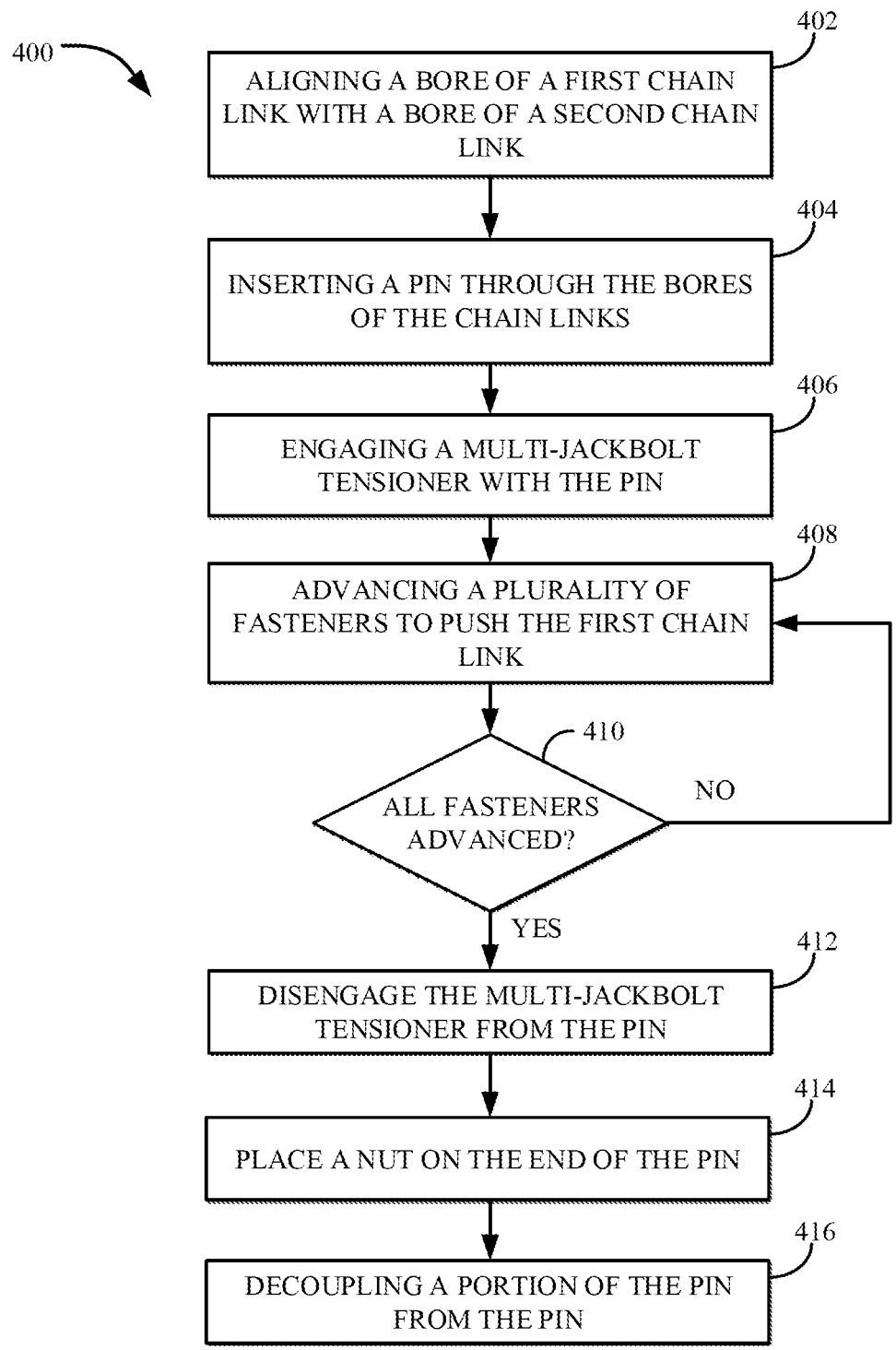
FIG. 13 shows a flowchart of a process for repairing a chain.

FIG. 13 shows a flowchart of a process 400 generally for repairing a chain (e.g., a chain having a plurality of chain links) implementing the disclosed assembly. This process 400 can be implemented using any of the chain repair systems described above (e.g., the chain repair system 150, 300, 350) or variations thereof.

At step 402, the process 400 can include aligning a bore of a first chain link (e.g., an outer chain link) with a bore of a second chain link (e.g., an inner chain link). In some embodiments, this can include aligning a hole of the first chain link with the bore of the second chain link. For example, a hole of a plate of the first chain link (e.g., the hole 174) can be aligned with the bore of the second chain link (e.g., the bore 116 of the chain link 102). In some embodiments, such as when more than one pin is needed to repair the chain, the step 402 of the process 400 can include aligning another bore of the first chain link with a bore of a third chain link (e.g., the chain link 104). In some cases, this can include aligning another hole of the first chain link with the bore of the third chain link. For example, a hole of a plate of the first chain link (e.g., the hole 180) can be aligned with the another bore of the second chain link.

At step 404, the process 400 can include inserting a pin through the bores of the chain links (e.g., the aligned bores of the chain links). In some embodiments, this can include inserting a thread end of the pin through a hole of a first plate of the first chain link (e.g., the hole 174), inserting the thread end of the pin through the bore of the second chain link (e.g., the bore 116 of the chain link 102), and inserting the thread end of the pin through a hole of another plate of the first chain link. In some embodiments, such as when more than one pin is needed to repair the chain, the step 404 of the process 400 can include inserting another pin through another pair of bores of the chain links. For example, this can include inserting the another pin through a bore of the first chain link and through a bore of the third chain link. In this case, this can include inserting a thread end of the another pin through another hole of a first plate of the first chain link (e.g., the hole 176), inserting the thread end of the another pin through the bore of the third chain link (e.g., the bore 134 of the chain link 104), and inserting the thread end of the another pin through another hole of the another plate of the first chain link.

At step 406, the process 400 can include engaging a multi-jackbolt tensioner with the pin. In some embodiments, this can include placing a washer around a portion of the thread end of the pin and in contact with the plate of the first chain link, securing the push plate relative to the pin to mitigate relative movement between the push plate and the pin (e.g., mitigating relative movement between the push plate and the pin), and threadingly engaging a fastener with each of the plurality of holes of the push plate until an end of each fastener presses on the chain link 152 (e.g., contacting the washer or the chain link). In some cases, this can include threadingly engaging a centrally located hole of a push plate of the multi-jackbolt tensioner (e.g., and advancing the push plate until the push plate contacts a peripheral flange of the pin), inserting a portion of the thread end of the pin through a centrally located hole of a push plate and then threadingly engaging a nut (e.g., the nut 372) with a portion of the threaded end of the pin, and threadingly engaging a fastener with a bore of the pin (e.g., the fastener 326 with the bore 316 of the pin 302). In some cases, such as when more than one pin is needed to repair the chain, the block 402 of the process 400 can include engaging another multi-jackbolt tensioner with another pin.

At step 408, the process 400 can include advancing a plurality of fasteners of the multi-jackbolt tensioner to push onto the first chain link (e.g., the plate of the first chain link). In some cases, this can include advancing the plurality of fasteners of the multi-jackbolt tensioner according to a fastening order. For example, FIG. 14A shows a top view of the multi-jackbolt tensioner 158 engaged with the pin 154 to illustrate a fastening order (e.g., a fastening pattern) for the fasteners 192, 194, 196, 198, 200. As shown in FIG. 14A, the fasteners can be fastened according to the fastening pattern by advancing the fastener 196 (e.g., denoted "1") by a particular amount further towards the first chain link, then advancing the fastener 200 (e.g., denoted "2") that is located opposite to the fastener 196 by substantially the particular amount (e.g., deviating by less than or equal to 20% the particular amount), then advancing the fastener 192 (e.g., denoted "3") that is located opposite the fastener 200 (but which has not yet been fastened in this fastening pattern) by substantially the particular amount, then advancing the fastener 198 (e.g., denoted "4") that is located opposite the fastener 192 by substantially the particular amount, and then advancing the fastener 194 (e.g., denoted "5") that is located opposite the fastener 198 (but which has not yet been fastened in this fastening pattern) by substantially the particular amount. This fastening pattern can be repeated, as needed, until each head of each fastener 192, 194, 196, 198, 200 contacts the push plate 190. This fastening pattern follows a star fastening pattern, however, in alternative configurations, the fastening pattern can be different. For example, the fastening pattern can follow a clockwise fastening pattern with the fastening order of the fasteners following this order: the fastener 196, 198, 200, 194, 192. As another example, the fastening pattern can follow a counter-clockwise fastening pattern with the fastening order of the fasteners following this order: the fastener 196, 192, 194, 200, 198.

In some embodiments, such as when there are an even number of fasteners of the multi-jackbolt tensioner, pairs of fasteners that are positioned on opposing portions of the push plate can be iteratively fastened. For example, FIG. 14B shows a top view of a multi-jackbolt tensioner 450 engaged with a pin (not shown) demonstrating an iterative fastening pattern. The multi-jackbolt tensioner 450 can include a push plate 452, and fasteners 454, 456, 458, 460, 462, 464 that are each threadingly engaged with the push plate 452 and are pushing on the first chain link. As shown in FIG. 14B, the fastener 454 is located opposite to the fastener 460, the fastener 456 is located opposite to the fastener 462, and the fastener 458 is located opposite to the fastener 464. The fasteners can be fastened according to the iterative fastening pattern by advancing the fastener 454 (e.g., denoted "1") by a particular amount further towards the first chain link, then advancing the fastener 460 (e.g., denoted "2") that is located opposite to the fastener 454 by substantially the particular amount (e.g., deviating by less than or equal to 20% the particular amount), then advancing the fastener 456 (e.g., denoted "3") by substantially the particular amount, then advancing the fastener 462 (e.g., denoted "4") that is located opposite the fastener 456 by substantially the particular amount, then advancing the fastener 458 (e.g., denoted "5") by substantially the particular amount, and then advancing the fastener 464 (e.g., denoted "6") that is located opposite the fastener 458 by substantially the particular amount. This fastening pattern can be repeated, as needed, until each head of each fastener 454, 456, 458, 460, 462, 464 contacts the push plate 452.

In some embodiments, such as when more than one pin is needed to repair the chain, the fasteners for the multi-jackbolt tensioners each engaged with a respective pin can collectively define a fastening pattern. For example, FIG. 14C shows a top view of the multi-jackbolt tensioners 158, 160 each engaged with a respective pin 154, 156. In some cases, the collective fastening pattern can include advancing one fastener of the multi-jackbolt tensioner 158, then advancing one fastener of the multi-jackbolt tensioner 160 (e.g., before fastening other fasteners of the multi-jackbolt tensioner 158, and which can have the same position as the fastener of the multi-jackbolt tensioner 158), and so on. In this case, because advancing of a fastener switches between each multi-jackbolt tensioner 158, 160, the amount of compressive force provided by the each multi-jackbolt tensioner 158, 160 onto the first chain link is substantially the same. In this way, tilting of the plate of the first chain link (e.g., the plate 168) that is closer to the multi-jackbolt tensioner 158, 160 is mitigated.

At step 410, the process 400 can include determining that all the fasteners of the multi-jackbolt tensioner have been advanced a particular amount (e.g., an amount need to create an interference fit between the first chain link and the pin). If at step 410, it is determined that the fasteners have not been advanced a particular amount, the process 400 can proceed back to step 408 to continue advancing the fasteners (e.g., according to a fastening pattern). If at step 410, it is determined that all the fasteners of the multi-jackbolt tensioner (or multiple multi-jackbolt tensioners) have been advanced a particular amount (e.g., until each head of each fastener contacts the push plate), the process 400 can proceed to step 412. In some embodiments, during (or after) steps 408, 410, the process 400 includes creating an interference fit between the pin and the plate of the chain link at the bore of first chain link (e.g., the hole of the plate of the first chain link).

At step 412, the process 400 can include disengaging the multi-jackbolt tensioner from the pin. In some cases, this can include removing a nut (e.g., the nut 372) from the pin (e.g., by threadingly disengaging the nut from the pin), removing each fastener from the push plate (e.g., by threadingly disengaging each fastener from the push plate), removing the push plate from the pin, removing a fastener from the pin, and removing the washer from the pin. In some embodiments, such as when more than one pin is needed to repair the chain, each multi-jackbolt tensioner can be disengaged from each pin.

At step 414, the process 400 can include placing a nut on the end of each pin. For example, this can include threadingly engaging the nut with a thread end of the pin (e.g., a threaded section of the pin that is closer to the first chain link. In addition, each nut can be advanced along each pin until each nut contacts the first chain link.

At step 416, the process 400 can include decoupling a portion of the pin from the pin. For example, this can include pulling (in a tensile manner) a first threaded section of the pin (e.g., that is located farther from the first chain link) from the pin so that the first threaded section fails at the bridge of the pin (e.g., between a notch). As another example, this can include, bending the first threaded section of the pin at the bridge so that the first threaded section fails at the bridge of the pin. In some cases, a torque bar (e.g., a cheater bar) can be received over the first thread section and rotated to provide a bending moment to break off the first threaded section of the pin via a bending failure. As yet another example, this can include twisting the first threaded section of the pin about the longitudinal axis of the pin to break off the first thread section of the pin at the bridge via a twisting failure. As yet another example, this can include shearing the first threaded section of the pin from the pin at the bridge to break off the first threaded section from the pin. In some cases, this can include grinding or cutting off the first threaded section of the pin at the bridge.

The present disclosure has described one or more preferred embodiments, and it should be appreciated that many equivalents, alternatives, variations, and modifications, aside from those expressly stated, are possible and within the scope of the invention.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature may sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

Certain operations of methods according to the disclosure, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

What is claimed is:

1. A chain repair system comprising:
   an inner chain link and an outer chain link each having a respective pair of bores;
   a pin including:
      a head end that defines a head;
      a thread end opposite the head end having threads; and
      a notch directed into a surface of the pin deeper than the threads of the pin, the notch being located between the head end and the thread end;
   a multi-jackbolt tensioner including:
      a plurality of fasteners;
      a press plate having a centrally located hole; and
      a plurality of other holes that surround the centrally located hole that are threaded, each fastener being configured to be received through and threadingly engaged with a respective hole of the plurality of other holes, and
   the multi-jackbolt tensioner is configured to engage the pin and is configured to be externally positioned relative to the outer chain link, and
   the multi-jackbolt tensioner is configured to create an interference fit between the pin and the outer chain link at the bore of the outer chain link.

2. The chain repair system of claim 1, wherein as the plurality of fasteners are advanced through their respective hole of the press plate and with the press plate engaged with the pin, a distance between the press plate and the outer chain link is increased to force the pin through the bore.

3. The chain repair system of claim 1, wherein the pin includes another notch directed into the surface of the pin deeper than the threads of the pin, the another notch being located between the head end and the thread end, and
    wherein the notch is directed into one side of the pin and the another notch is directed into an opposing side of the pin.

4. The chain repair system of claim 3, wherein the notch and the another notch are each v-shaped cutouts.

5. The chain repair system of claim 1, wherein the threads of the thread end of the pin define a first threaded section,
    wherein the thread end of the pin includes a second threaded section, and
    wherein the notch is situated between the first threaded section and the second threaded section.

6. The chain repair system of claim 5, wherein the notch of the pins defines a bridge that connects the first threaded section to the second threaded section,
    wherein a width of the second threaded section is smaller than a width of the first threaded section, and
    wherein a thickness of the bridge is smaller than the width of the second threaded section.

7. The chain repair system of claim 5, wherein the pin includes a peripheral flange that extends around the pin, the peripheral flange being located between the first threaded section and the second threaded section.

8. The chain repair system of claim 5, wherein when the pin fractures at the notch, the first threaded section of the pin is decoupled from the pin.

9. The chain repair system of claim 8, further comprising a nut that is configured to threadingly engage the first threaded section of the pin, and
    wherein an end of the nut is configured to contact the outer chain link.

10. The chain repair system of claim 9 wherein the nut is at least one of a lock nut, or a self-locking nut.

11. The chain repair system of claim 1, wherein an interference fit is created between the pin and the outer chain link when each fastener is advanced until each head of each fastener contacts the press plate.

12. The chain repair system of claim 1, wherein when the interference fit is created between the pin and the outer chain link, the inner chain link is configured to rotate about the pin.

13. The chain repair system of claim 1, further comprising:
    another inner chain link having another pair of bores;
    another pin;
    another jackbolt tensioner;
    wherein the another pin is configured to be received through the other bore of the outer chain link and a bore of the another inner chain link;
    wherein the another jackbolt tensioner is configured to threadingly engage an end of the another pin and to force the another pin through the other bore of the outer chain link thereby forming an interference fit between the another pin and the outer chain link at the other bore.

14. A method for repairing a chain using the chain repair system of claim 1, the method comprising:
    aligning the bore of the outer chain link with the bore of the inner chain link;
    inserting the pin through the aligned bores;
    engaging the multi-jackbolt tensioner with the thread end of the pin;
    advancing each of the plurality of fasteners on the multi-jackbolt tensioner to press on the outer chain link;
    forming the interference fit between the pin and the outer chain link at the bore of the outer chain link from the advancing of the fasteners.

15. The method of claim 14, further comprising fracturing, at the notch of the pin, at least a portion of the thread end of the pin from the pin.

16. The method of claim 15, further comprising:
    inserting the thread end of the pin through a hole of the outer chain link that partially defines the bore of the outer chain link;
    inserting the thread end of the pin through both holes of the inner chain link that define the bore of the inner chain link;
    threadingly engaging the centrally located hole of the press plate of the multi-jackbolt tensioner with the threads of the pin, the push plate having the plurality of other holes that surround the centrally located hole;
    threadingly engaging each fastener with a respective hole of the plurality of other holes of the press plate; and
    advancing each of the plurality of fasteners to press on the outer chain link to separate the press plate away from the outer chain link.

17. The method of claim 16, further comprising advancing each of the plurality of fasteners in an alternating pattern to iteratively rotate and advance the press plate.

18. The method of claim 14, further comprising:
    decoupling the multi-jackbolt tensioner from the pin; and
    after decoupling the multi-jackbolt tensioner form the pin, fracturing off a portion of the thread end of the pin from the pin.

19. The method of claim 18, further comprising after the at least portion of the thread end of the pin is decoupled from the pin, threadingly engaging a nut with the pin until the nut contacts the outer chain link.

20. The chain repair system of claim 1, wherein the pin further comprises:
    a body having a first cross-section that is uniform throughout a length of the body in which the head is coupled to one end of the body, the head having a larger cross-section than the first cross-section of the body; and
    an extension coupled to an opposing end of the body, the extension having the threads including a first threaded section and a second threaded section, the extension further having the notch located between the first threaded section and the second threaded section, the notch being directed into a surface of the pin deeper than the threads of the first and second threaded sections of the pin,
    wherein the body of the pin is configured to form the interference fit with the outer chain link at the bore of the outer chain link to couple the outer chain link to the pin, and wherein the pin is configured to fracture at the notch to decouple the first threaded section from the pin.

* * * * *